(12) United States Patent
Metz et al.

(10) Patent No.: US 10,002,021 B2
(45) Date of Patent: Jun. 19, 2018

(54) DEFERRED PREEMPTION TECHNIQUES FOR SCHEDULING GRAPHICS PROCESSING UNIT COMMAND STREAMS

(75) Inventors: Eduardus A Metz, Markham (CA); Nigel Terence Poole, Newton, MA (US); Colin Christopher Sharp, San Diego, CA (US); Andrew Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 13/554,805

(22) Filed: Jul. 20, 2012

(65) Prior Publication Data

US 2014/0022266 A1    Jan. 23, 2014

(51) Int. Cl.
G06T 1/20     (2006.01)
G06F 9/46     (2006.01)
G06F 9/48     (2006.01)

(52) U.S. Cl.
CPC ............ *G06F 9/4806* (2013.01); *G06F 9/461* (2013.01); *G06F 9/4812* (2013.01); *G06T 1/20* (2013.01)

(58) Field of Classification Search
CPC .......... G06F 15/00; G06T 1/00–1/0092; G06T 15/00–15/005
USPC ................................................. 345/501, 522
See application file for complete search history.

(56) References Cited

U.S. PATENT DOCUMENTS

| | | |
|---|---|---|
| 6,809,735 B1 | 10/2004 | Stauffer et al. |
| 7,207,042 B2 | 4/2007 | Smith et al. |
| 7,545,381 B2 * | 6/2009 | Huang et al. ................ 345/522 |
| 7,565,659 B2 | 7/2009 | Day et al. |
| 7,673,304 B2 | 3/2010 | Gosalia et al. |

(Continued)

FOREIGN PATENT DOCUMENTS

CN    1916962 A    2/2007

OTHER PUBLICATIONS

Holenderski et al., "Using Fixed Priority Scheduling with Deferred Preemption to Exploit Fluctuating Network Bandwidth," Proceedings Work in Progress Session of the 20th Euromicro Conference on Real-Time Systems, pp. 40-43, Jul. 2008, available at https://www.ideals.illinois.edu/bitstream/handle/2142/11461/Proceedings%20Work-In-Progress%20Session%20of%20the%2020th%20Euromicro-%20Conference%20on%20Real-Time%20Systems.pdf?sequence=2.

(Continued)

*Primary Examiner* — Jacinta M Crawford
(74) *Attorney, Agent, or Firm* — Schumaker & Sieffert, P.A.

(57) ABSTRACT

This disclosure is directed to deferred preemption techniques for scheduling graphics processing unit (GPU) command streams for execution on a GPU. A host CPU is described that is configured to control a GPU to perform deferred-preemption scheduling. For example, a host CPU may select one or more locations in a GPU command stream as being one or more locations at which preemption is allowed to occur in response to receiving a preemption notification, and may place one or more tokens in the GPU command stream based on the selected one or more locations. The tokens may indicate to the GPU that preemption is allowed to occur at the selected one or more locations. This disclosure further describes a GPU configured to preempt execution of a GPU command stream based on one or more tokens placed in a GPU command stream.

62 Claims, 9 Drawing Sheets

(56) References Cited

U.S. PATENT DOCUMENTS

| | | | |
|---|---|---|---|
| 7,844,970 | B2 | 11/2010 | Theurer |
| 2007/0103476 | A1 | 5/2007 | Huang et al. |
| 2007/0220517 | A1 | 9/2007 | Lippett |
| 2009/0219288 | A1* | 9/2009 | Heirich .................. G06T 15/80 345/426 |
| 2011/0050713 | A1* | 3/2011 | McCrary et al. ............. 345/522 |
| 2011/0072211 | A1 | 3/2011 | Duluk, Jr. et al. |
| 2012/0139930 | A1* | 6/2012 | Rogers et al. ............... 345/522 |
| 2013/0054875 | A1* | 2/2013 | Ross et al. ................... 711/103 |
| 2013/0155080 | A1* | 6/2013 | Nordlund et al. ............ 345/522 |
| 2013/0179614 | A1* | 7/2013 | Ross et al. ................... 710/264 |

OTHER PUBLICATIONS

Altmeyer et al., "Computing the Maximum Blocking Time for Scheduling with Deferred Preemption", Future Dependable Distributed Systems, 2009, Software Technologies for, IEEE, Piscataway, NJ, USA, Mar. 17, 2009, pp. 200-204, XP031826018, ISBN: 978-0-7695-3572-2.

Altmeyer et al., "Computing the Maximum Blocking Time for Scheduling with Deferred Preemption", 2009, retrieved from http://www.researchgate.net/profile/Reinhard_Wilhelm/ publication/232621617_Computing_the_Maximum_Blocking_Time_for_Scheduling_with_Deferred_Preemption/links/0fcfd50d08fb461010000000, Slides 1-9, Mar. 2009.

Calhoun et al., "Preemption of a CUDA Kernel Function", Software Engineering, Artificial Intelligence, Networking and Parallel & Distributed Computing (SNPD), 13th ACIS International Conference on Software Engineering, IEEE, Aug. 8, 2012, pp. 247-252, XP032236314.

Elliott et al., "Robust Real-Time Multiprocessor Interrupt Handling Motivated by GPUs", Real-Time Systems (ECRTS), 2012, 24th Euromicro Conference on, IEEE, Jul. 11, 2012, pp. 267-276, XP032218046, DOI: 10.1109/ECRTS.2012.20 ISBN: 978-1-4673-2032-0.

International Search Report and Written Opinion—PCT/US2013/046844, International Search Authority—European Patent Office, dated Nov. 11, 2013, 11 pp.

Kato et al., "RGEM: A Responsive GPGPU Execution Model for Runtime Engines", 2011, IEEE 32nd Real-Time Systems Symposium, Nov. 2011, pp. 57-66, XP055086374, DOI: 10.1109/RTSS.2011.13 ISBN: 978-1-45-772000-0.

Response to Written Opinion dated Nov. 11, 2013, from International Application No. PCT/US2013/046844, filed May 20, 2014, 41 pp.

Second Written Opinion from International Application No. PCT/US2013/046844, dated Jul. 17, 2014, 7 pp.

Response to Second Written Opinion dated Jul. 17, 2014, from International Application No. PCT/US2013/046844, filed on Sep. 17, 2014, 9 pp.

International Preliminary Report on Patentability from International Application No. PCT/US2013/046844 dated Nov. 17, 2014, 8 pp.

\* cited by examiner

DEFERRED PREEMPTION TECHNIQUES FOR SCHEDULING GRAPHICS PROCESSING UNIT COMMAND STREAMS

TECHNICAL FIELD

This disclosure relates to graphics processing systems, and more particularly, to graphics processing systems that utilize command streams.

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. Modern day CPUs are typically capable of concurrently executing multiple applications, each of which may need to utilize the GPU during execution. The arbitration of GPU resources between the different applications that are currently executing on the host CPU can pose a significant challenge to a host CPU, particularly in cases where certain applications may require high priority access to the GPU.

SUMMARY

This disclosure is directed to deferred preemption techniques for scheduling graphics processing unit (GPU) command streams for execution on a GPU. In some examples, the techniques of this disclosure may include placing one or more tokens in a GPU command stream to indicate particular locations in the GPU command stream where preemption is allowed to occur. When a GPU is processing the GPU command stream and receives notification from a host device to preempt execution of the GPU command stream in order to execute another GPU command stream, the GPU may continue processing commands in the GPU command stream until the GPU reaches a location in the GPU command stream where preemption is allowed to occur. Upon reaching a location where preemption is allowed to occur, the GPU may switch to executing the other GPU command stream. The GPU command streams may, in some examples, be associated with different graphics processing contexts.

In one example, this disclosure describes a method that includes selecting, with a processor, one or more locations in a GPU command stream as being one or more locations at which a GPU that processes the GPU command stream is allowed to preempt execution of the GPU command stream in response to receiving a notification from the processor to preempt execution of the GPU command stream. The method further includes placing, with the processor, one or more tokens in the GPU command stream based on the selected one or more locations. The one or more tokens indicate to the GPU that preemption is allowed to occur at the selected one or more locations in the GPU command stream.

In another example, this disclosure describes a device that includes a processor configured to select one or more locations in a GPU command stream as being one or more locations at which a GPU that processes the GPU command stream is allowed to preempt execution of the GPU command stream in response to receiving a notification from the processor to preempt execution of the GPU command stream. The processor is further configured to place one or more tokens in the GPU command stream based on the selected one or more locations. The one or more tokens indicate to the GPU that preemption is allowed to occur at the selected one or more locations in the GPU command stream.

In another example, this disclosure describes an apparatus that includes means for selecting one or more locations in a GPU command stream as being one or more locations at which a GPU that processes the GPU command stream is allowed to preempt execution of the GPU command stream in response to receiving a notification to preempt execution of the GPU command stream. The apparatus further includes means for placing one or more tokens in the GPU command stream based on the selected one or more locations. The one or more tokens indicate to the GPU that preemption is allowed to occur at the selected one or more locations in the GPU command stream.

In another example, this disclosure describes a computer-readable storage medium storing instructions that, when executed, cause one or more processors to select one or more locations in a GPU command stream as being one or more locations at which a GPU that processes the GPU command stream is allowed to preempt execution of the GPU command stream in response to receiving a notification from the one or more processors to preempt execution of the GPU command stream. The instructions further cause the one or more processors to place one or more tokens in the GPU command stream based on the selected one or more locations. The one or more tokens indicate to the GPU that preemption is allowed to occur at the selected one or more locations in the GPU command stream.

In another example, this disclosure describes a method that includes preempting, with a GPU, execution of a GPU command stream based on one or more tokens included in the GPU command stream. The one or more tokens indicate that preemption is allowed to occur at one or more locations in the GPU command stream.

In another example, this disclosure describes an apparatus that includes a GPU configured to preempt execution of a GPU command stream based on one or more tokens included in the GPU command stream. The one or more tokens indicate that preemption is allowed to occur at one or more locations in the GPU command stream.

In another example, this disclosure describes an apparatus that includes means for executing a GPU command stream. The apparatus further includes means for preempting execution of the GPU command stream based on one or more tokens included in the GPU command stream. The one or more tokens indicate that preemption is allowed to occur at one or more locations in the GPU command stream.

In another example, this disclosure describes a computer-readable storage medium storing instructions that, when executed, cause a GPU to preempt execution of a GPU command stream based on one or more tokens included in the GPU command stream. The one or more tokens indicate that preemption is allowed to occur at one or more locations in the GPU command stream.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
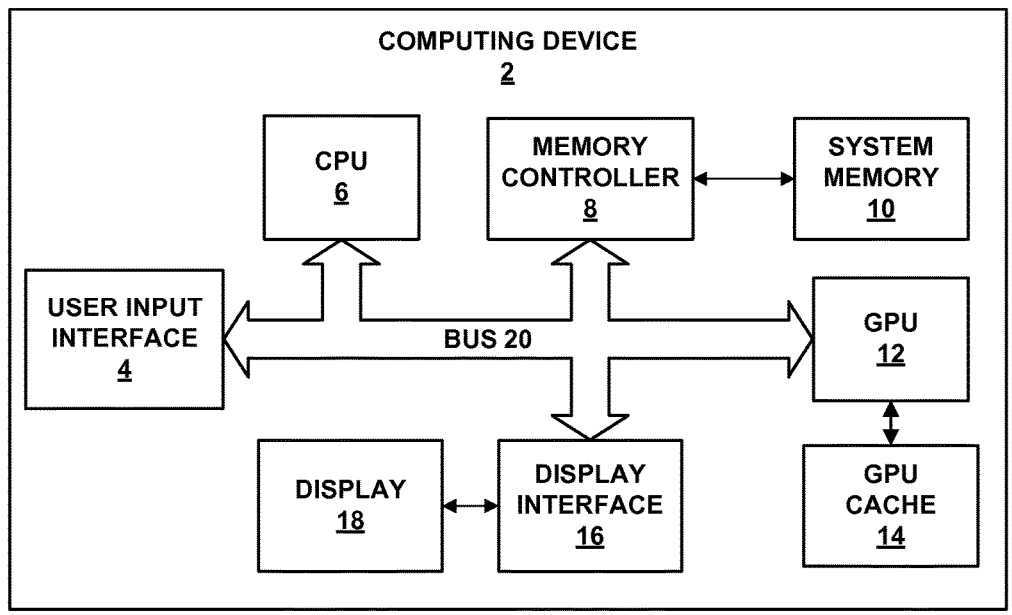
FIG. 1 is a block diagram illustrating an example computing device that may be used to implement the deferred-preemptive GPU command stream scheduling techniques of this disclosure.

This disclosure is directed to deferred preemption techniques for scheduling graphics processing unit (GPU) command streams for execution on a GPU. Today, GPUs are increasingly being used for user interface (UI) rendering. UI command streams typically need to be serviced in a timely fashion in order to achieve the proper visual effects and responsiveness that users have come to expect in a UI. When a high-priority UI command stream is queued by a host CPU to be executed on a GPU, the GPU may be executing another queued command stream associated with a different context that has a lower priority, such as, e.g., a non-UI graphics context or a context that uses a GPU to perform a general-purpose computing task (i.e., a general-purpose computing on graphics processing unit (GPGPU) task). Waiting for the lower-priority context to complete execution prior to executing the higher-priority UI command stream may not, in some cases, produce an acceptable user experience with respect to the UI.

One solution to this problem is to allow the host CPU to preempt execution of the lower-priority command stream and to service a higher-priority command stream whenever the host CPU determines that the higher-priority command stream needs to be executed. However, such a solution can be expensive in terms of the overhead (e.g., additional processing time, additional memory bandwidth usage, and/ or additional memory usage) needed to perform context switching in the GPU at arbitrary points in the GPU command stream. For example, each time a higher-priority command stream needs to preempt a lower-priority command stream, the GPU state for the lower-priority command stream may need to be saved prior to executing the higher-priority command stream and subsequently restored after executing the higher-priority command stream. The additional overhead needed to perform such context switching may be more expensive at certain locations in the GPU command stream than at other locations in the GPU command stream. Therefore, allowing preemption to occur at arbitrary points in the GPU command stream may result in the preemption of the GPU command stream at locations where the overhead due to context switching is relatively expensive, thereby reducing the overall performance of the GPU.

According to various examples described in this disclosure, deferred-preemptive scheduling techniques are provided for a graphics processing system. The deferred-preemptive scheduling techniques may be used to allow a higher-priority command stream to preempt execution of a lower-priority command stream at particular preemption points within the lower-priority command stream. That is, the techniques of this disclosure may allow a host CPU to place one or more tokens in the lower-priority command stream to indicate particular locations in the lower-priority command stream where preemption is allowed to occur. When a lower-priority command stream is executing on a GPU, and the GPU command engine receives a signal from the host CPU indicating that a higher-priority command stream is ready to be executed, the command engine may defer the preemption of the lower-priority command stream until the next preemption point is encountered in the lower-priority command stream.

A host CPU may, in some cases, place preemption points at locations in the lower-priority command stream where the overhead due to preemption (e.g., additional processing time, additional memory bandwidth usage, and/or additional memory usage) is relatively small compared to the overhead that may occur due to preemption at other locations in the lower-priority command stream. By deferring preemption to those locations within a lower-priority command stream where the preemption overhead is relatively inexpensive, the techniques of this disclosure may be able to improve the overall performance of a graphics processing system in which a high-priority command stream (e.g., a UI command stream) executing on a GPU may need to preempt other lower-priority command streams.

FIG. 1 is a block diagram illustrating an example computing device 2 that may be used to implement the deferred-preemption GPU command stream scheduling techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a GPU cache 14, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory system 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purposed computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computer device 2 via a wired or wireless communications link. For instance, display 18 may be a computer monitor or flat panel display connected to a personal computer via a cable or wireless link.

According to this disclosure, CPU 6 may generate command streams for execution by GPU 12 that include one or more tokens which indicate locations in the command streams where GPU 12 is allowed to preempt execution of the command streams. For example, CPU 6 may select one or more locations in a GPU command stream as being one or more locations at which GPU 12, which processes the GPU command stream, is allowed to preempt execution of the GPU command stream in response to receiving a notification from CPU 6 to preempt execution of the GPU command stream. CPU 6 may place one or more tokens in the GPU command stream based on the selected one or more locations. The one or more tokens may indicate to GPU 12 that preemption is allowed to occur at the selected one or more locations in the GPU command stream. For example, CPU 6 may place one or more tokens in the GPU command stream for each of the selected locations. In such examples, for each of the selected locations, the one or more tokens associated with the respective location may indicate to GPU 12 that preemption is allowed to occur at the respective location. In some examples, CPU 6 may store the resulting command stream in memory 10, which may be accessible by GPU 12. The GPU command stream may be an ordered sequence of GPU commands associated with a particular application context executing on CPU 6.

In some examples, the locations at which preemption is allowed to occur may be command boundaries within the GPU command stream. A command boundary may refer to a point in the GPU command stream that occurs after completion of the execution of a first GPU command and prior to the commencement of execution of a second GPU command. The first and second GPU commands may be referred to as boundary commands with respect to the particular command boundary. The second GPU command may occur immediately after the first GPU command in a sequence of GPU commands that forms the GPU command stream. In such examples, CPU 6 may select particular command boundaries in the GPU command stream for allowing preemption to occur, and place one or more tokens in the GPU command stream indicating the selected command boundaries to the GPU. A command boundary that is selected by CPU 6 for allowing preemption to occur may be referred to herein as a preemption point.

In further examples, the locations at which preemption is allowed to occur may be a sequence of one or more GPU commands in the GPU command stream. The sequence of one or more GPU commands may form part of the ordered sequence of GPU commands that forms the GPU command stream. In such examples, CPU 6 may select a particular sequence of GPU commands from the GPU command stream for allowing preemption to occur, and place one or more tokens in the GPU command stream indicating the selected sequence of GPU commands. A sequence of commands that is selected by CPU 6 for allowing preemption to occur may be referred to herein as a preemption range. In additional examples, the locations at which preemption is allowed to occur may include a combination of preemption points and preemption ranges.

In some cases, CPU 6 may select particular sequences of GPU commands from the GPU command stream for allowing preemption to occur at least in part by selecting a particular sequence of GPU commands from the GPU command stream for not allowing preemption to occur. A sequence of commands that is selected by CPU 6 for not allowing preemption to occur may be referred to herein as a non-interruptible range of GPU commands. In such examples, CPU 6 may place one or more tokens in the GPU command stream indicating the selected non-interruptible sequence of GPU commands.

CPU 6 may generate a resulting GPU command stream that includes one or more tokens indicating locations where preemption is allowed to occur. In some examples, the resulting GPU command stream may include an ordered sequence of command slots, each of the command slots including at least one of a GPU command or a preemption token. In cases where CPU 6 selects a command boundary as a preemption point, CPU 6 may, in some examples, place a token in a command slot that is between two different command slots associated with the boundary commands of the command boundary. In cases where CPU 6 selects a command sequence as a preemption range, CPU 6 may, in some examples, place a token in a command slot that occurs immediately prior to the command slot that holds the first GPU command of the command sequence and another token immediately after the command slot that holds the last GPU command of the command sequence. In cases where CPU 6 selects a command sequence as a non-interruptible range, CPU 6 may, in some examples, place a token in a command slot that occurs immediately prior to the command slot that holds the first GPU command of the non-interruptible range of commands and another token immediately after the command slot that holds the last GPU command of the non-interruptible range of commands.

CPU 6 may select particular locations in a GPU command stream to be preemption points based on various selection criteria. In some examples, CPU 6 may select one or more locations in the GPU command stream for allowing preemption to occur based on an estimated cost of performing a context switch at particular locations in the GPU command stream. In such examples, the estimated cost of performing a GPU context switch may, in some examples, be a function of one or more of the following: (1) an estimated or actual amount of processing time needed to perform a GPU context switch (i.e., a processing time overhead); (2) an estimated or actual amount of memory bandwidth usage needed to perform a GPU context switch (i.e., a memory bandwidth overhead); (3) an estimated or actual amount of memory needed to perform the GPU context switch (i.e., a memory usage overhead); and (4) any other overhead parameter associated with the performance of a GPU context switch.

In further examples, CPU 6 may select one or more locations in the GPU command stream for allowing preemption to occur based on information indicative of groupings of commands in the GPU command stream. In such examples, each of the groupings of commands may be associated with a task or set of tasks to be performed by GPU 12. In some cases, one or more of the groupings of commands may be associated with the rendering of a respective one of a plurality of graphics frames. In further cases, one or more of the groupings of commands may be associated with the execution of a respective one of a plurality of GPU kernels. In additional cases, one or more of the groupings of commands may be associated with the execution of a respective one of a plurality of GPU tasks. The GPU task may, in some examples, be the rendering of a single primitive (e.g., triangle) or group of primitives. In cases where a grouping of commands is associated with the rendering of a single primitive, CPU 6 may, for example, place a token in the GPU command stream prior to and/or after each draw call command (i.e., a command that instructs the GPU to render a primitive or triangle) in the GPU command stream. In cases where a grouping of commands is associated with the rendering of multiple primitives, CPU 6 may, for example, place a token in the GPU command stream prior to and/or after the multiple draw call commands associated with the rendering of the multiple primitives in the GPU command stream.

In additional examples, CPU 6 may select one or more locations in the GPU command stream for allowing preemption to occur based on information received from a software application associated with the GPU command stream indicating at least one of particular commands where preemption should occur and particular commands where preemption should not occur. In yet another example, CPU 6 may place a preemption token between each command in a GPU command stream or between each command in a subset of the GPU command stream. Further examples may use combinations of these criteria or other criteria in addition to or in lieu of the above-mentioned criteria.

In general, the token placed in the GPU command stream may be any type of information placed in the GPU command stream that is indicative of whether preemption is allowed to occur at one or more locations in the GPU command stream. In some examples, the token may be a command that is placed in a command slot of the GPU command stream and that indicates to GPU 12 whether preemption is allowed to occur at one or more locations in the GPU command stream. For example, one or more particular operational codes (i.e., opcodes) may be used to indicate that a command is a preemption token. In such examples, CPU 6 may place the token in the GPU command stream at least in part by placing a command having an opcode that indicates that the command is a preemption token into the GPU command stream. In some cases, different commands or opcodes may be used to indicate different types of preemption tokens (e.g., tokens that indicate preemption points and/or tokens that indicate the beginning and end of preemption ranges or non-interruptible ranges).

In further examples, the tokens may be integrated into existing GPU commands. For example, the GPU command format may include an information field that indicates whether a particular GPU command includes a preemption token. In such examples, preemption tokens may be placed in the same command slot as other GPU commands that are not necessarily related to preemption, such as, e.g., GPU graphics commands and/or GPU computing commands. In such examples, the token may be a value that is placed into the information field that indicates that a particular GPU command includes a preemption token, and CPU 6 may place the token in the GPU command stream at least in part by setting the information field of a particular GPU command to the value that indicates that the particular GPU command contains a preemption token. In some cases, different values may be placed into the information field and/or one or more additional information fields may be used to indicate different types of preemption tokens (e.g., tokens that indicate preemption points and/or tokens that indicate the beginning and end of preemption ranges or non-interruptible ranges). The information fields may include one-bit flags, multi-bit codes, etc.

In additional examples, the token may take the form of an absence of a particular code, absence of a particular command field, absence of one or more bits, absence of a command or absence of another feature that is typically included in the GPU command stream. For example, a bit may be included in all commands that do not include tokens, but such a bit may be omitted in commands that include preemption tokens. As another example, a command slot that does not include a command (e.g., a command slot that includes a no operation (no-op)) may serve as a preemption token.

In further examples, the tokens may include any combination of the above-mentioned types of tokens. For example, CPU 6 may use dedicated commands as tokens as well as information fields within other types of commands to designate tokens.

GPU 12 may be configured to preempt execution of a GPU command stream based on one or more tokens placed in the GPU command stream by CPU 6. For example, GPU 12 may dispatch one or more commands in a first GPU command stream for execution on one or more processing units in GPU 12, and receive a preemption notification from CPU 6 indicating that a second GPU command stream is ready to execute on GPU 12. The second GPU command stream may have a scheduling priority that is greater than a scheduling priority of the first GPU command stream. In response to receiving the preemption notification, GPU 12 may determine when to preempt execution of the first GPU command stream based on one or more tokens placed in the first GPU command stream.

In some examples, in response to receiving the preemption notification, GPU 12 may dispatch one or more commands in the first GPU command stream for execution on the one or more processing units in GPU 12 until a token is encountered in the first GPU command stream. In response to encountering the token in the first GPU command stream, GPU 12 may preempt execution of the first GPU command stream and switch to execution of the second GPU command stream. For example, GPU 12 may save a state of GPU 12 associated with execution of the first GPU command stream, and dispatch one or more commands in the second GPU command stream for execution on the one or more processing units in GPU 12.

In further examples, while GPU 12 is processing the first GPU command stream, GPU 12 may maintain a preemption allowed state variable, the value of which at a given point in time may indicate whether GPU 12 is allowed to preempt execution of the first GPU command stream at that given point in time. GPU 12 may update or change the preemption allowed state variable in response to tokens contained in the first GPU command stream. In examples where the tokens in the first GPU command stream indicate the beginning and end of a preemption range of GPU commands, GPU 12 may update the preemption allowed state variable to a value that indicates that preemption is allowed to occur in response to processing a beginning preemption range token, and update the preemption allowed state variable to a value that indicates that preemption is not allowed to occur in response to processing an ending preemption range token. In examples where the tokens in the first GPU command stream indicate the beginning and end of a non-interruptible range of GPU commands, GPU 12 may update the preemption allowed state variable to a value that indicates that preemption is not allowed to occur in response to processing a beginning non-interruptible range token, and to update the preemption allowed state variable to a value that indicates that preemption is not allowed to occur in response to processing an ending non-interruptible range token.

CPU 6 may, in some cases, select locations for preemption in a command stream where the overhead due to preemption (e.g., additional processing time, additional memory bandwidth usage, and/or additional memory usage) is relatively small compared to the overhead that may occur due to preemption at other locations in the command stream. By deferring preemption to those locations within a lower-priority command stream where the preemption overhead is relatively inexpensive, the techniques of this disclosure may be able to improve the overall performance of a graphics processing system in which a high-priority command stream may need to preempt other command streams executing on a GPU.

Figure 2:
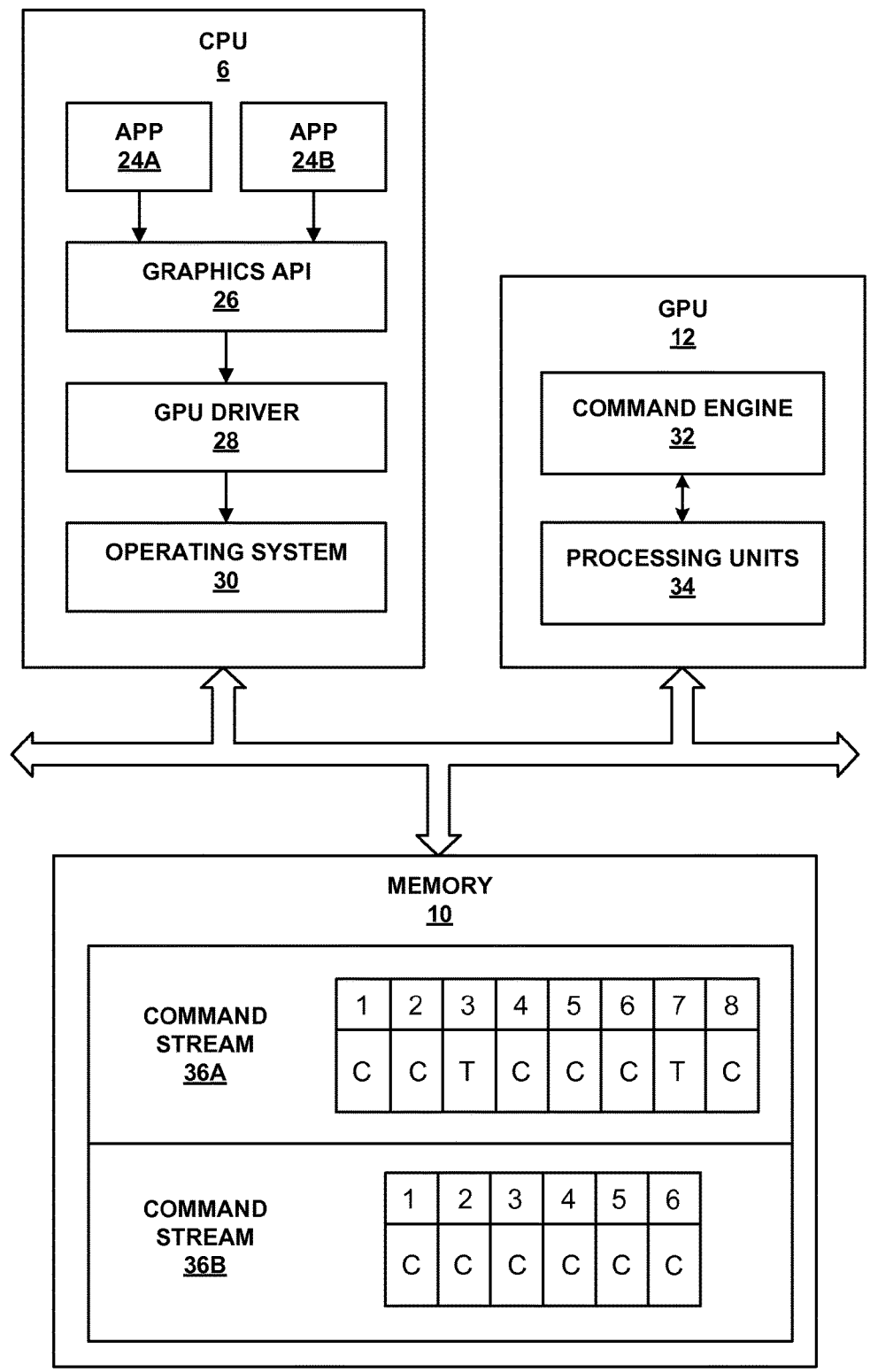
FIG. 2 is a block diagram illustrating the CPU, the GPU and the memory of the computing device in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC). CPU 6 is configured to execute software applications 24A, 24B, a graphics API 26, a GPU driver 28 and an operating system 30. GPU 12 includes a command engine 32 and one or more processing units 34. Memory 10 stores command streams 36A, 36B.

Software applications 24A, 24B may each include at least one of one or more instructions that cause graphics images to be displayed or one or more instructions that cause a non-graphics task (e.g., a general-purposed computing task) to be performed on GPU 12. Software applications 24A, 24B may issue instructions to graphics API 26. Graphics API 26 may be a runtime service that translates the instructions received from software applications 24A, 24B into a format that is consumable by GPU driver 28.

GPU driver 28 receives the instructions from software applications 24A, 24B, via graphics API 26, and controls the operation of GPU 12 to service the instructions. For example, GPU driver 28 may formulate one or more command streams 36A, 36B, place the command streams 36A, 36B into memory 10, and instruct GPU 12 to execute command streams 36A, 36B. GPU driver 28 may place command streams 36A, 36B into memory 10 and communicate with GPU 12 via operating system 30, e.g., via one or more system calls.

GPU driver 28 may send a preemption notification to GPU command engine 32 to indicate that another command stream (e.g., a high-priority command stream) is ready for execution. In some examples, the preemption notification may also indicate to GPU 12 which command stream to execute upon preemption of the command stream currently being executed. GPU driver 28 may send a preemption notification to GPU command engine 12, for example, by writing one or more values (e.g., via operating system 30) to one or more GPU registers that are polled by GPU command engine 32. The one or more GPU registers may include one or more hardware GPU registers that are located in GPU 12, one or more memory-mapped GPU registers that are located in a memory (e.g., memory 10) or any combination thereof When writing values to a memory-mapped GPU register, CPU 6 may write the values to one or more particular memory addresses in memory 10 that are polled by GPU command engine 32. In some examples, GPU driver 28 may write a first value to one or more GPU registers to activate a preemption notification, and write a second value to the one or more GPU registers that identifies the location of the command stream to execute upon preemption of the command stream currently being executed.

Command engine 32 is configured to retrieve the commands stored in command streams 36A, 36B, and dispatch the commands for execution on one or more of processing units 34. Command engine 32 may dispatch commands from a command stream for execution on all or a subset of processing units 34. In some examples, command engine 32 may be configured to poll one or more GPU registers that indicate whether CPU 6 has sent a preemption notification to GPU 12. In cases where the GPU registers are memory-mapped registers, command engine 32 may be configured to poll one or more particular memory addresses in memory 10 that indicate whether CPU 6 has sent a preemption notification to GPU 12. In response to the one or more GPU registers indicating that CPU 6 has sent a preemption notification to GPU 12, command engine 32 may preempt execution of the GPU command stream that is currently executing and begin to execute another command stream. In some cases, command engine 32 may be configured to determine the command stream to execute upon preemption of the currently executing command stream by reading information stored in the one or more GPU registers 12 that identifies the command stream to execute upon preemption. For example, CPU 6 may store a pointer in the one or more GPU registers that identifies the memory location of the higher priority command stream.

To preempt a command stream, command engine 32 may save a state of GPU 12 associated with execution of the command stream. The state of GPU 12 associated with the execution of the command stream may include program counters, thread activation states, graphics drawing state variables (such as, e.g., color, primitive type, transform type, etc.), memory state and/or any other state that is used to execute the command stream. In some examples, the state variables may be local state variables associated with individual processing units 34 or groups of processing units 34, global state variables associated with the global execution of GPU 12, or any combination thereof Saving the state of GPU 12 may involve, for example, storing the current values of one or more registers in GPU 12 in another on-chip or off-chip location. Saving the state of GPU 12 may involve, for example, storing the current state of local GPU memory in another on-chip or off-chip location. In some examples, command engine 32 may save the GPU state to memory 10.

After execution of the preempting command stream has completed, command engine 32 may restore the saved state of the preempted command stream that was executing prior to the preemption notification. Restoring the saved state may involve, for example, reloading state variables into the one or more registers of GPU 12 and/or reloading a saved memory state into local GPU memory. In examples where the GPU state is saved to memory 10, command engine 32 may reload the saved state stored in memory 10 onto GPU 12 for further execution of the preempted command stream.

Processing units 34 may include one or more processing units, each of which may be a programmable processing unit or a fixed function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, alpha blending, etc.

In the example graphics processing system of FIG. 2, memory 10 includes two command streams 36A, 36B, each command stream 36A, 36B being associated with a different graphics application context (i.e., a different one of software applications 24A, 24B). For example, command stream 36A is associated with a graphics application context for software application 24A, and command stream 36B is associated with a graphics application context for software application 24B. For ease of illustration, two GPU command streams 36A, 36B are depicted as being stored in memory 10 of the example graphics processing system of FIG. 2. In other examples, however, the same or a different number of GPU command streams may be used that are stored in the same or different components of a graphics processing system.

As shown in FIG. 2, each command stream 36A, 36B has a plurality of command slots, which are identified by the numbers across the top of the command stream. Each command slot may hold a command packet (C) or a token packet (T). A command packet may include one or more GPU commands for execution on the GPU. A token packet may not necessarily include a command, but may include a token that is used to indicate a particular location in the command stream where preemption is allowed to occur (i.e., a preemption point), a particular range of commands where preemption is allowed to occur (i.e., a preemption range), or a particular range of commands where preemption is not allowed to occur (i.e., a non-interruptible range).

GPU driver 28 of CPU 6 may be configured to write command streams 36A, 36B to memory 10, and command engine 32 of GPU 12 may be configured to read one or more commands of command streams 36A, 36B from memory 10. In some examples, one or both of command streams 36A, 36B may be stored as a ring buffer in memory 10. A ring buffer may be a buffer with a circular addressing scheme where CPU 6 and GPU 12 maintain synchronized state variables associated with the writing of data to and reading of data from the ring buffer. For example, if command stream 36A is a ring buffer, each of CPU 6 and GPU 12 may store a write pointer indicating the next address to be written to in the ring buffer, and a read pointer indicating the next address to be read from in the ring buffer. When CPU 6 writes a new command to the ring buffer, CPU 6 may update the write pointer in CPU 6 and instruct GPU 12 to update the write pointer in GPU 12. Similarly, when GPU 12 reads a new command from the ring buffer, GPU 12 may update the read pointer in GPU 12 and instruct CPU 6 to update the read pointer in CPU 6. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 28 and an example GPU command engine 32 designed in accordance with this disclosure will now be described with respect to FIG. 2. In this example, software application 24B has a higher scheduling priority than the scheduling priority of software application 24A. In particular, in this example, software application 24B is a user interface (UI) software application that includes one or more instructions that cause a graphics image to be displayed and that demands high priority access to GPU 12 to ensure timely updates of the UI. Meanwhile, in this example, software application 24A is a lower-priority application that includes one or more instructions that cause graphics images to be displayed and/or one or more instructions that cause a non-graphics task (e.g., a GPGPU computing task) to be performed on GPU 12.

GPU driver 28 receives one or more instructions from software application 24A that specify graphics operations and/or general-purpose computing operations to be performed by GPU 12. GPU driver 28 generates an intermediate command stream to carry out the operations specified by the received instructions, selects one or more locations in the intermediate command stream for allowing preemption to occur, and places a token in the intermediate command stream at each of the locations where preemption is allowed to occur in order to produce an output command stream 36A. GPU driver 28 places output command stream 36A into memory 10, which is accessible by GPU command engine 32. GPU driver 28 notifies GPU command engine 32 that command stream 36A corresponding to software application 24A is available for processing. For example, GPU driver 28 may write one or more values indicating that command stream 36A is ready for execution to a GPU register (e.g., a GPU hardware register polled by GPU 12 and/or a GPU memory-mapped register polled by GPU 12).

Upon notification that command stream 36A is ready for execution, command engine 32 of GPU 12 may determine if resources are currently available on GPU 12 to begin executing command stream 36A. If resources are available, command engine 32 begins to dispatch the commands in command stream 36A in numerical order based on command slot. More specifically, command engine 32 dispatches the command packets contained in command slots 1 and 2 for execution on one or more of processing units 34. In response to encountering the token packet at command slot 3, command engine 32 determines if GPU 12 has received any preemption notifications from CPU 6. In this case, command engine 32 has not received any preemption notifications, so command engine 32 proceeds to dispatch the command at command slot 4 of command stream 36A.

Meanwhile, GPU driver 28 receives one or more instructions from UI software application 24B that specify high-priority graphics operations to be performed by GPU 12. GPU driver 28 generates a high-priority command stream 36B to carry out the operations specified by the received instructions, and places the resulting command stream 36B into memory 10. GPU driver 28 provides a preemption notification to GPU command engine 32 indicating that high-priority command stream 36 is ready for processing and that command stream 36 should preempt any other lower-priority command streams that are executing on GPU 12 according to the deferred preemption techniques of this disclosure. In some examples, GPU driver 28 may provide the preemption notification to GPU 12 by writing to a GPU hardware register that is polled by the GPU 12 and/or by writing to a memory-mapped register (e.g., a particular location in memory 10) that is polled by GPU 12.

Prior to dispatching the command at command slot 5 in command stream 36A, GPU command engine 32 receives the preemption notification indicating that the higher-priority command stream 36B is ready for processing and that the higher-priority command stream 36B should preempt the processing of any other lower-priority command streams (i.e., command stream 36A). However, because command engine 32 implements a deferred preemption scheme, command engine 32 continues to dispatch commands from command stream 36A until a token packet (i.e., a preemption point) is encountered in command stream 36A. More specifically, command engine 32 dispatches the commands in command slots 5 and 6 for execution on one or more of processing elements 34.

In response to encountering the token packet at command slot 7, command engine 32 determines if GPU 12 has received any preemption notifications from CPU 6. In this case, GPU 12 has received a preemption notification, so command engine 32 proceeds to perform a context switch from processing commands associated with command stream 36A to processing commands associated with high-priority command stream 36B. In some cases, to perform the context switch, command engine 32 may save the state of the GPU (e.g., the state of one or more registers and/or the state of a memory in GPU 12) for the currently processed context (i.e., for software application 24A) in memory 10. In addition, if a GPU state was previously saved for UI software application 24B, then the context switch may also restore the previously saved GPU state for UI software application 24B.

After performing the context switch, command engine 32 proceeds to dispatch the commands in command slots 1-6 of command stream 36B for execution on one or more of processing units 34 of GPU 12. After finishing the processing of the command stream 36B, command engine 32 performs another context switch to continue processing the remaining commands in command stream 36A. Performing the context switch may involve restoring the state of the registers and/or memory in GPU 12 to the state that was saved prior to the previous context switch. After performing the context switch, command engine 32 proceeds to dispatch the command in command slot 8 of the command stream 36A for execution on one or more of processing units 34.

In the example command stream 36A shown in FIG. 2, GPU driver 28 determined that the commands in command slots 4-6 formed a logical grouping of commands associated with the execution of a particular GPU task or operation (e.g., the rendering of a particular frame or the execution of a particular GPU computing task), and that an estimated cost (e.g., in terms of processing time, memory bandwidth usage and/or memory usage) for performing a context switch while executing the logical grouping of commands would be relatively expensive compared to merely waiting until command slot 7 to perform the context switch. Therefore, graphics driver 28 placed a token at command slot 7 indicating that GPU 12 is allowed to preempt execution of the commands stream at command slot 7. As such, even though command engine 32 received a preemption notification prior to executing the command at command slot 5, the deferred preemption techniques of this disclosure effectively allowed the preemption to be deferred to a point in command stream 36A where the context switch would be less costly in terms of processing time, memory bandwidth usage and/or memory usage. In this manner, the techniques of this disclosure may be used to improve the overall performance of a graphics processing system.

Although FIG. 2 illustrates an example where higher-priority command stream 36B (i.e., the UI command stream) does not include token packets, in other examples, the command stream 36B may include token packets, which would cause command stream 36B to be preempted by an even higher-priority command stream in the event that CPU 6 sends a preemption notification to GPU 12 during the execution of command stream 36B. In general, the techniques of this disclosure may allow, in some examples, any number of nested preemptions to occur.

Figure 3:
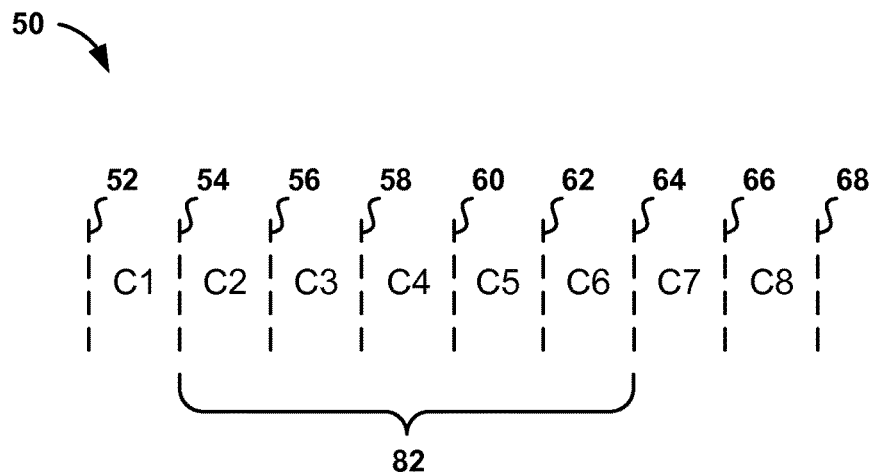
FIG. 3 is a conceptual diagram illustrating a GPU command stream into which tokens may be placed in accordance with this disclosure.
Figure 4:
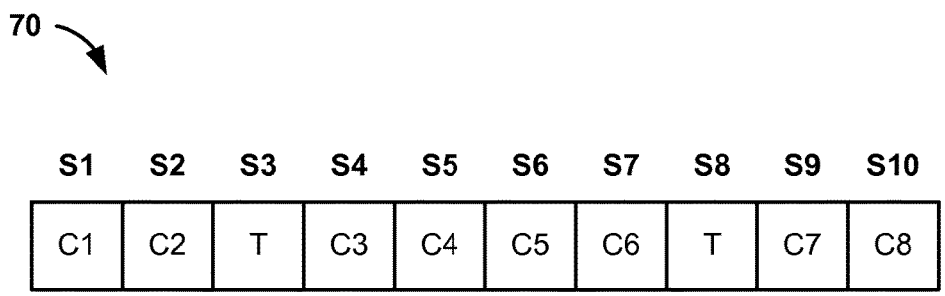
FIG. 4 is a conceptual diagram illustrating a technique for placing tokens in the GPU command stream of FIG. 3 in accordance with this disclosure.
Figure 5:
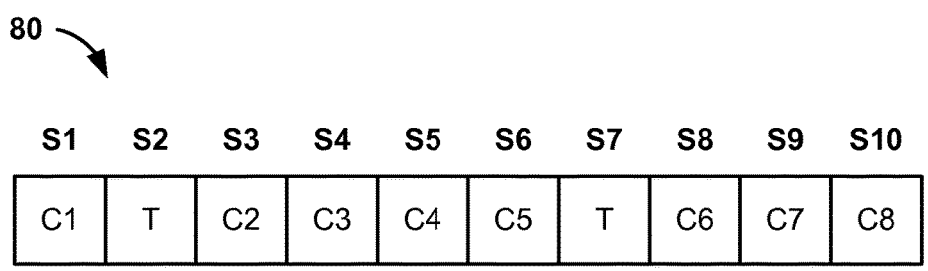
FIG. 5 is a conceptual diagram illustrating another example technique for placing tokens in the GPU command stream of FIG. 3 in accordance with this disclosure.

FIGS. 3-5 are conceptual diagrams illustrating various techniques for placing tokens in GPU command streams in accordance with this disclosure. FIG. 3 illustrates an example intermediate GPU command stream 50 that contains a sequence of GPU commands (i.e., C1, C2 . . . C8). The GPU commands may be any type of graphics processing command capable of being executed by a GPU. For example, the commands may be drawing commands, state programming commands, general-purpose GPU computing commands etc. Command boundaries 52, 54, 56, 58, 60, 62, 64, 66 and 68 are defined between each of the commands. In some examples, GPU driver 28 may receive intermediate GPU command stream 50 directly from one of software applications 24A, 24B. In additional examples, GPU driver 28 may generate intermediate GPU command stream 50 based on instructions received from one of software applications 24A, 24B.

FIG. 4 illustrates an example output GPU command stream 70 generated by GPU driver 28. As shown in FIG. 4, output GPU command stream 70 includes an ordered sequence of command slots (i.e., S1, S2 . . . S10). Each command slot includes at least one of a command from intermediate GPU command stream 50 or a token (i.e., T). In some examples, each command may be referred to as a command packet, and each token may be referred to as a token packet. To generate output GPU command stream 70, GPU driver 28 selects command boundaries 56 and 64 as being locations where preemption is allowed to occur. That is, command boundaries 56 and 64 are selected to be locations at which GPU 12 is allowed to preempt execution of output GPU command stream 70 in response to GPU 12 receiving a preemption notification from CPU 6 instructing GPU 12 to preempt execution of output GPU command stream 70. Commands C2 and C3 may be referred to as boundary commands with respect to command boundary 56, and commands C6 and C7 may be referred to as boundary commands with respect to command boundary 64.

To indicate that command boundary 56 is a selected command boundary at which preemption is allowed to occur, GPU driver 28 places a token in a command slot (S3) that is between the command slots (S2, S4) that hold the boundary commands (C2, C3) for command boundary 56. Similarly, to indicate that command boundary 64 is a selected command boundary at which preemption is allowed to occur, GPU driver 28 places a token in a command slot (S8) that is between the command slots (S7, S9) that hold the boundary commands (C6, C7) for command boundary 64.

In the example output GPU command stream 70 of FIG. 4, the tokens indicate particular preemption points in output GPU command stream 70 where GPU 12 is allowed to preempt execution of output GPU command stream 70 in response to receiving a preemption notification from CPU 6. For example, a token that is placed in a particular command slot indicates that preemption is allowed to occur after executing the command in the command slot immediately prior to the command slot in which the token is placed and prior to executing the command in the command slot that is immediately after the command slot in which the token is placed. As a specific example, the token placed in the S3 command slot indicates that preemption is allowed to occur after executing command C2 and prior to executing command C3.

When GPU 12 processes output GPU command stream 70, if GPU 12 encounters a token, then GPU 12 may determine whether a preemption notification has been received from CPU 6. If a preemption notification has been received from CPU 6, then GPU 12 may preempt execution of output GPU command stream 70 to execute another GPU command stream specified by CPU 6. Otherwise, if a preemption notification has not been received when GPU 12 encounters the token, then GPU 12 may continue processing the next command slot in output GPU command stream 70 without preempting execution of output GPU command stream 70.

GPU driver 28 may select command boundaries 56, 64 for allowing preemption to occur based on various criteria. In some examples, GPU driver 28 may select command boundaries 56, 64 in output GPU command stream 70 based on an estimated cost of performing a GPU context switch at particular locations in the GPU command stream. For example, GPU driver 28 may determine that the estimated cost of performing a GPU context switch at each of command boundaries 56, 64 is lower compared to the estimated cost of performing a GPU context switch at one or more of command boundaries 52, 54, 58, 60, 62, 66, 68. The estimated cost of performing a GPU context switch may, in some examples, be a function of one or more of the following: (1) an estimated or actual amount of processing time needed to perform a GPU context switch (i.e., a processing time overhead); (2) an estimated or actual amount of memory bandwidth usage needed to perform a GPU context switch (i.e., a memory bandwidth overhead); (3) an estimated or actual amount of memory needed to perform the GPU context switch (i.e., a memory usage overhead); and (4) any other overhead parameter associated with the performance of a GPU context switch.

In further examples, GPU driver 28 may select command boundaries 56, 64 in output GPU command stream 70 based on information indicative of logical groupings of commands contained in intermediate GPU command stream 50 that are associated with the execution of a particular GPU task or operation (e.g., the rendering of a particular frame or the execution of a particular GPU task). In some cases, GPU driver 28 may receive the information indicative of the logical groupings of commands from a software application (e.g., software applications 24A, 24B) associated with intermediate GPU command stream 50. For example, GPU driver 28 may receive instructions from a software application for performing a particular set of GPU tasks, and the received instructions may identify the beginning and/or end of each of the GPU tasks. In additional cases, GPU driver 28 may determine the information indicative of the logical groupings of commands based on intermediate GPU command stream 50 in cases where GPU driver 28 receives intermediate GPU command stream 50 from a software application.

In some examples, a logical grouping of commands may include commands associated with the rendering of a single graphics frame or a single group of graphics frames. For example, different groupings of commands may be associated with different rendering frames, and tokens may be placed in output GPU command stream 70 between the different groupings of commands associated with each of the different rendering frames. As a specific example, commands C1 and C2 may be associated with a first rendering frame, commands C3, C4, C5 and C6 may be associated with a second rendering frame, and commands C7 and C8 may be associated with a third rendering frame. In this specific example, tokens are placed in command slots S3 and S8 as shown in FIG. 4 to allow preemption to occur between the processing of commands for different rendering frames. In other words, GPU driver 28 may determine that the command sequence defined by commands C1 and C2, the command sequence defined by commands C3, C4, C5 and C6, and the command sequence defined by commands C7 and C8 are non-interruptible command sequences. In additional examples, a logical grouping of commands may include commands associated with the execution of a single GPU kernel or a single GPU task or include commands associated with the execution of a group of GPU kernels or tasks. For example, for GPU computing applications, different groupings of commands may be associated with the execution of different GPU kernels or tasks, and tokens may be placed in output GPU command stream 70 between the different groupings of commands associated with each of the GPU kernels or tasks.

In additional examples, GPU driver 28 may select command boundaries 56, 64 in output GPU command stream 70 based on information received from a software application (e.g., software applications 24A, 24B) associated with output GPU command stream 70. For example, a software application may provide information to GPU driver 28 that indicates one or more particular commands and/or command boundaries where preemption should occur and/or one or more particular commands and/or command boundaries where preemption should not occur. GPU driver 28 may place tokens in output GPU command stream 70 to indicate these locations.

FIG. 5 illustrates an example output GPU command stream 80 generated by GPU driver 28. As shown in FIG. 5, output GPU command stream 80 includes an ordered sequence of command slots (i.e., S1, S2 . . . S10). Each command slot includes at least one of a command from intermediate GPU command stream 50 or a token (i.e., T). To generate output GPU command stream 80, GPU driver 28 selects command sequence 82 (i.e., commands C2, C3, C4, C5, C6) in intermediate GPU command stream 50 (FIG. 3) as being a location where preemption is allowed to occur. That is, the commands in command sequence 82 are selected to be locations at which GPU 12 is allowed to preempt execution of output GPU command stream 80 in response to receiving a notification from CPU 6 to preempt execution of output GPU command stream 80. Commands C1 and C7 may be referred to as boundary commands with respect to command sequence 82.

To indicate that command sequence 82 is a selected command range within which preemption is allowed to occur, GPU driver 28 places a token in a command slot (S2) that occurs immediately prior to the command slot (S3) that holds the first GPU command of command sequence 82. In addition, GPU driver 28 places another token in a command slot (S7) that occurs immediately after the command slot (S6) that holds the last GPU command of the command sequence 82.

In the example output GPU command stream 80 of FIG. 5, the tokens indicate a particular preemption range in output GPU command stream 80 where GPU 12 is allowed to preempt execution of output GPU command stream 80 in response to receiving a preemption notification from CPU 6. For example, a begin preemption range token placed in a first command slot (S2) may indicate the beginning of a preemption range, and an end preemption range token placed in a second command slot (S7) may indicate the end of a preemption range. The begin preemption range token may indicate that preemption is allowed to occur any time after processing the begin preemption range token and prior to the processing of an end preemption range token. The end preemption range token may indicate that preemption is not allowed to occur after processing the end preemption range token. For the example preemption range (C2, C3, C4, C5) shown in FIG. 5, it should be noted that the tokens in command slots S2 and S7 indicate that preemption may occur in between any one of commands C2, C3, C4, and C5, immediately prior to command C2 but after processing the token in command slot S2, and immediately after processing command C5 but prior to processing the token in command slot S7.

During the processing of output GPU command stream 80, when GPU 12 encounters the token in command slot S2, GPU 12 sets a preemption allowed state variable to a value indicating that preemption is allowed for currently processed commands. When GPU 12 encounters the token in command slot S7, GPU 12 resets the preemption allowed state variable to a value indicating that preemption is not allowed for currently processed commands. If GPU 12 receives a preemption notification from CPU 6, GPU 12 may determine whether the preemption allowed state variable indicates that preemption is currently allowed. If preemption is currently allowed, then GPU 12 may preempt execution of output GPU command stream 80. Otherwise, if preemption is not currently allowed, then GPU 12 may defer preemption until another token is encountered indicating the beginning of a command sequence where preemption is allowed.

In the example output GPU command stream 80 depicted in FIG. 5, the preemption tokens placed in command slots S2 and S7 indicate, respectively, the beginning and end of a command range 82 within which preemption is allowed to occur. In additional examples, command range 82 may be selected by GPU driver 28 to be a non-interruptible range of commands. In such examples, the preemption tokens placed in command slots S2 and S7 may indicate, respectively, the beginning and end of a command range 82 at which preemption is not allowed to occur. The selection of command range 82 may be based on various criteria similar to those outlined above with respect to FIG. 4.

Although the example output GPU command streams 70, 80 shown in FIGS. 4 and 5 depict the tokens as occupying individual command slots without an additional command included in the command slot, in other examples, the command slot may include both a token and a command. For example, a flag included in a particular command may indicate whether a token is included in the same command slot as the command.

Figure 6:
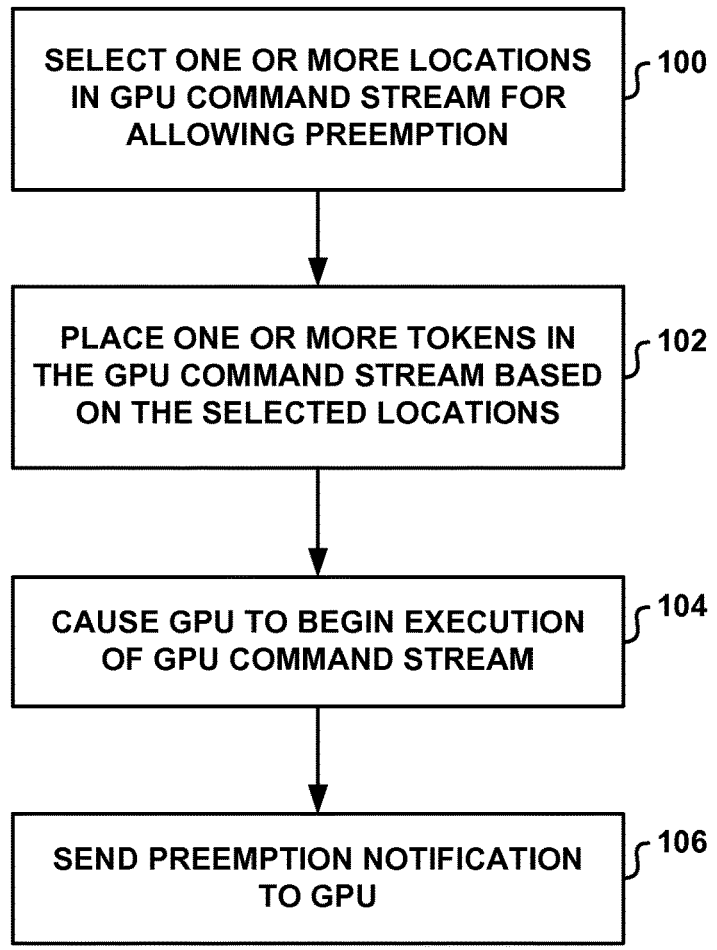
FIG. 6 is a flow diagram illustrating an example technique for controlling a GPU to perform deferred-preemptive scheduling in accordance with this disclosure.

FIG. 6 is a flow diagram illustrating an example technique for controlling a GPU to perform deferred-preemption scheduling in accordance with this disclosure. The example technique shown in FIG. 6 is described as being performed by CPU 6 shown in FIGS. 1 and 2 for exemplary purposes. In other examples, the technique illustrated in FIG. 6 may be implemented in any of the systems or components shown in FIGS. 1 and 2 of this disclosure (e.g., GPU driver 28 operating on CPU 6) or in other types of graphics processing systems not specifically mentioned herein.

CPU 6 selects one or more locations in a GPU command stream for allowing preemption to occur (100). In other words, CPU 6 selects one or more locations in the GPU command stream as being locations at which GPU 12, which processes the GPU command stream, is allowed to preempt execution of the GPU command stream in response to receiving a preemption notification from CPU 6 to preempt execution of the GPU command stream. CPU 6 places one or more tokens in the GPU command stream based on the selected one or more locations (102). The one or more tokens may indicate to GPU 12 that preemption is allowed to occur at the selected one or more locations in the GPU command stream. For example, CPU 6 may place one or more tokens in the GPU command stream for each of the selected locations. In such examples, for each of the selected locations, the one or more tokens associated with the respective location may indicate to GPU 12 that preemption is allowed to occur at the respective location. In some examples, CPU 6 may place a single token in the GPU command stream for each of the locations at which preemption is allowed to occur. In such examples, the single token may, in some cases, be placed at the actual location (e.g., command boundary) in the GPU command stream where preemption is allowed to occur to produce a one-to-one mapping between tokens and respective locations in the GPU command stream at which preemption is allowed to occur. In additional examples, CPU 6 may place multiple tokens in the GPU command stream for each of the locations at which preemption is allowed to occur. In further examples, CPU 6 may place one or more tokens in the GPU command stream at locations that are not necessarily locations at which preemption is allowed to occur, but such tokens may nevertheless indicate the actual locations where preemption is allowed to occur in the GPU command stream.

CPU 6 causes GPU 12 to begin execution of the GPU command stream (104). While the GPU command stream is executing on GPU 12, CPU 6 sends a preemption notification to GPU 12 indicating that another GPU command stream is ready to execute on the GPU 12 (106). The preemption notification may further indicate that GPU 12 should preempt any command streams executing on GPU 12 that have a scheduling priority lower than a scheduling priority of the first GPU command stream based on the one or more tokens placed in the GPU command stream. The second GPU command stream may have a scheduling priority that is greater than a scheduling priority of the first GPU command stream.

In some examples, CPU 6 may select one or more command boundaries as being locations at which GPU 12 is allowed to preempt execution of the GPU command stream, and place one or more tokens in the GPU command stream to indicate the selected boundaries to GPU 12. For example, for each selected command boundary, CPU 6 may place a token in a command slot that is between two different command slots associated with the boundary commands of the respective command boundary. In such examples, the tokens may indicate, in some examples, that preemption is allowed to occur after processing the command immediately prior to the command boundary and prior to processing the command immediately after the command boundary.

In further examples, CPU 6 may select one or more command ranges as being locations at which GPU 12 is allowed to preempt execution of the GPU command stream, and place one or more tokens in the GPU command stream to indicate the selected command ranges to GPU 12. For example, for each selected command range, CPU 6 may place a token in a command slot that occurs immediately prior to the command slot that holds the first GPU command of the command range and another token immediately after the command slot that holds the last GPU command of the command range. In such examples, the token may indicate, in some examples, that preemption is allowed to occur in between processing any of the commands in the command range, after processing the command immediately prior to the command range, and prior to processing the command immediately after the command range.

In additional examples, CPU 6 may select one or more command ranges as being locations at which the GPU is not allowed to preempt execution of the GPU command stream, and select one or more locations as being locations at which the GPU is allowed to preempt execution of the GPU command stream based on the selected one or more command ranges. For example, CPU 6 place a token in a command slot that occurs immediately prior to the command slot that holds the first GPU command of the non-interruptible range of commands and another token immediately after the command slot that holds the last GPU command of the non-interruptible range of commands. The tokens that indicate the beginning and end of a non-interruptible range of commands may also indicate, respectively, the end and beginning of command ranges where preemption is allowed to occur.

In some examples, CPU 6 may select locations in the command stream where preemption is allowed to occur based on an estimated cost of performing a GPU context switch at a plurality of locations in the command stream. For example, CPU 6 may select a particular location as a location where preemption is allowed to occur if the estimated cost for performing a GPU context switch at that particular location is less than a threshold. In some implementations, the threshold may be a predetermined threshold. In other implementations, the threshold may be determined based on a statistical analysis of estimated costs to perform GPU context switches in various locations of the command stream. For example, CPU 6 may select one or more particular locations where preemption is allowed to occur if the estimated cost for performing a GPU context switch at those particular locations is less than the estimated cost for performing a GPU context switch at one or more other non-selected locations. As another example, out of all of the possible locations, the GPU driver may determine the 10 percent of the locations which have a lowest estimated cost to perform the GPU context switch, and select those locations as locations where preemption is allowed to occur. The estimated cost of performing a GPU context switch may, in some examples, be an actual cost determined by CPU 6. The estimated or actual cost may, in some examples, be a function of one or more of the following: (1) an estimated or actual amount of processing time needed to perform a GPU context switch (i.e., a processing time overhead); (2) an estimated or actual amount of memory bandwidth usage needed to perform a GPU context switch (i.e., a memory bandwidth overhead); (3) an estimated or actual amount of memory needed to perform the GPU context switch (i.e., a memory usage overhead); and (4) any other overhead parameter associated with the performance of a GPU context switch.

In further examples, CPU 6 may select locations in the command stream where preemption is allowed to occur based on logical groupings of commands contained in the instructions received from a software application associated with the command stream. Each of the commands within a logical grouping of commands may be associated with a task or set of tasks to be performed by GPU 12. In some cases, one or more of the groupings of commands may be associated with the execution of a respective one of a plurality of GPU kernels. For example, the instructions provided by a software application (e.g., software applications 24A, 24B) may include instructions that define a kernel to be executed by GPU 12 (e.g., a logical grouping of operations for a general-purpose computing algorithm in which several instances of the logical grouping of operations may be executed by GPU 12 in parallel). Interrupting the execution of the instructions that define the kernel in this example may cause an expensive (i.e., high cost) context switch in terms of processing time, memory bandwidth usage, and/or memory usage. Therefore, in this example, CPU 6 may determine not to place any tokens within a group of commands that is associated with the execution of the GPU kernel, and to place one or more tokens before and/or after the group of commands associated with the execution of the GPU kernel.

In additional cases, one or more of the groupings of commands may be associated with the rendering of a respective one of a plurality of graphics frames. For example, the instructions provided by the software application may include drawing operations for a plurality of graphics frames to be rendered. In such an example, CPU 6 may determine not to place any tokens within a group of commands that is associated with the rendering of a particular graphics frame, and to place one or more tokens before and/or after the group of commands associated with the rendering of the graphics frame.

In further cases, one or more of the groupings of commands may be associated with the execution of a respective one of a plurality of GPU tasks. For example, the GPU task may be a draw call command (i.e., a command that instructs the GPU to render a primitive or triangle), and CPU 6 may place a token between each draw call command in a set of draw commands in the GPU command stream or between each group of draw call commands associated with the rendering of multiple primitives in a GPU command stream.

In additional examples, CPU 6 may select locations in the command stream where preemption is allowed to occur based on information received from a software application regarding particular commands where preemption should or should not be allowed to occur. For example, the instructions provided by the software application may identify logical groupings of operations and/or instructions in a program where preemption may or may not occur. As another example, the instructions provided by the software application may identify particular instructions in a program or commands where preemption may or may not occur. In such a case, CPU 6 may place tokens in the command stream based on this information.

FIGS. 7-11 are flow diagrams illustrating various techniques for preempting execution of command streams based on tokens placed in a GPU command stream in accordance with this disclosure. The example techniques shown in FIG. 7-11 are described as being performed by GPU 12 shown in FIGS. 1 & 2 for exemplary purposes. In other examples, the techniques illustrated in FIGS. 7-11 may be implemented in any of the systems or components shown in FIGS. 1-2 of this disclosure (e.g., command engine 32 of GPU 12) or in other types of graphics processing systems not specifically mentioned herein.

Figure 7:
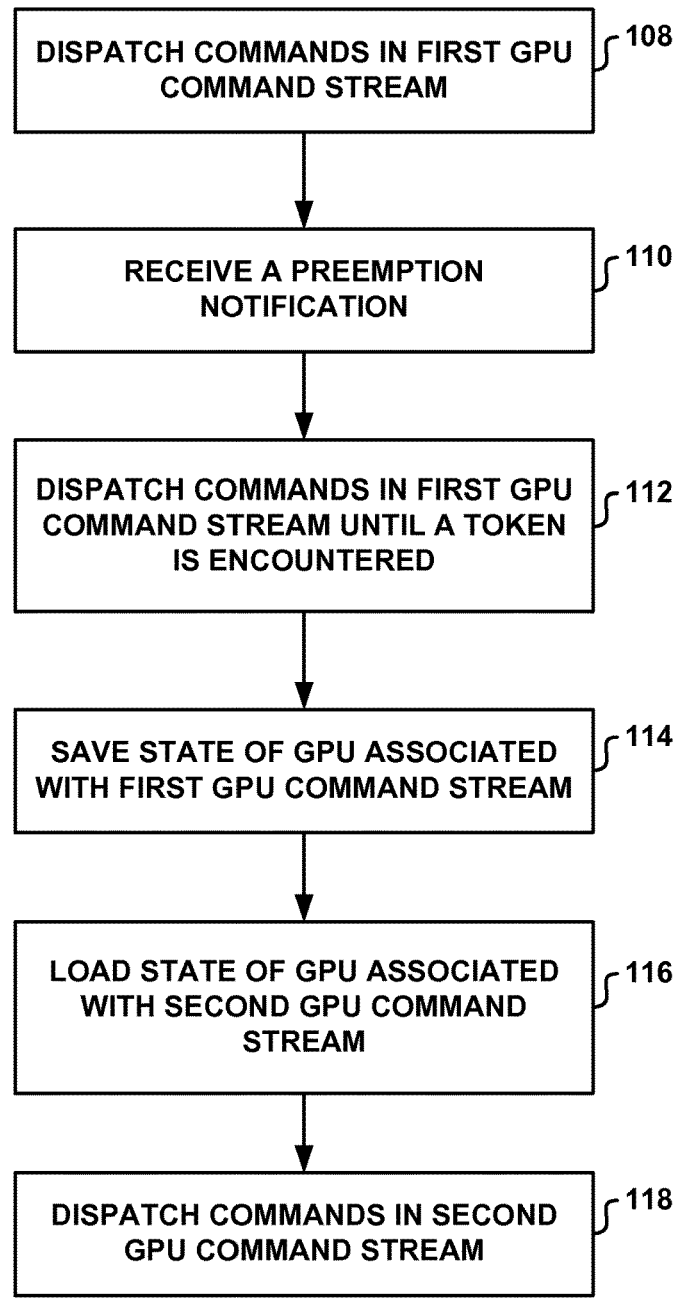
FIG. 7 is a flow diagram illustrating an example technique for preempting execution of command streams based on tokens placed in a GPU command stream in accordance with this disclosure.

FIG. 7 is a flow diagram illustrating an example technique for preempting execution of a GPU command streams based on tokens placed in the GPU command stream in accordance with this disclosure. GPU 12 dispatches one or more commands in a first GPU command stream for execution on one or more of processing units 34 in GPU 12 (108). GPU 12 receives a preemption notification (110). The preemption notification indicates that a second GPU command stream is ready to execute on GPU 12. The second GPU command stream may have a scheduling priority that is greater than a scheduling priority of the first GPU command stream. The scheduling priority for a particular GPU command stream may, in some examples, indicate one or more of the following: (1) whether the particular GPU command stream is allowed to preempt the execution of other GPU command streams; (2) which of the other GPU commands streams the particular GPU command stream is allowed to preempt if any; (3) whether the particular GPU command stream is allowed to be preempted by other GPU command streams; and (4) which of the other GPU command streams is allowed to preempt the particular GPU command stream if any.

In some examples, the scheduling priority for each GPU command stream may be equal to a value within a range of possible scheduling priority values. In such examples, GPU command streams that have higher scheduling priority values may, in some cases, be able to preempt the execution of GPU command streams that have lower scheduling priority values. Similarly, in some cases, GPU command streams that have lower scheduling priority values may be able to preempted by GPU command streams that have higher scheduling priority values. The scheduling priority values may, in some examples, be specified by a graphics driver (e.g., GPU driver 28 in FIG. 1) or by a user application (e.g., applications 24A, 24B in FIG. 1).

In response to receiving the preemption notification, GPU 12 dispatches one or more commands in the first GPU command stream for execution on one or more of processing units 34 until a token is encountered in the first GPU command stream (112). In response to encountering the token in the first GPU command stream, GPU 12 saves a state of GPU 12 associated with execution of the first GPU command stream (114). GPU 12 may optionally load a state of GPU 12 associated with execution of the second GPU command stream if a previous state was saved with respect to the execution of the second GPU command stream (116). GPU 12 dispatches one or more commands in a second GPU command stream for execution on one or more of processing units 34 in GPU 12 (118).

Figure 8:
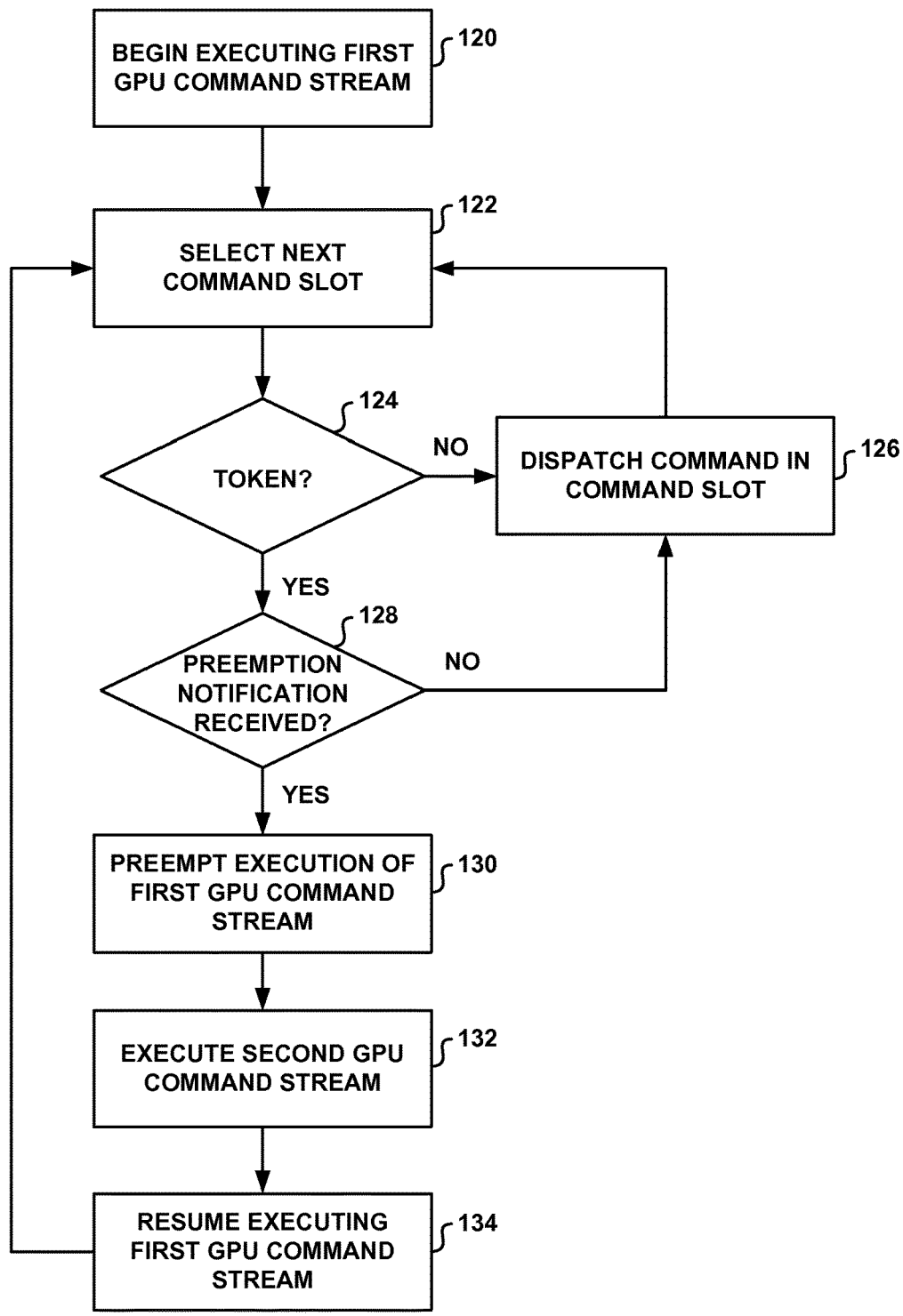
FIG. 8 is a flow diagram illustrating an example technique for processing GPU command streams in accordance with this disclosure.

FIG. 8 is a flow diagram illustrating an example technique for processing GPU command streams in accordance with this disclosure. The technique illustrated in FIG. 8 may be used with preemption tokens that indicate particular preemption points where preemption is allowed to occur, e.g., the preemption tokens described above with respect to FIG. 4.

GPU 12 begins executing a first GPU command stream (120). GPU 12 selects a next command slot for processing (122). In the case where GPU 12 performs process box 122 for the first time after beginning execution of the first GPU command stream, GPU 12 selects the first command slot in the first GPU command stream for processing.

GPU 12 determines if the command slot contains a token (124). In response to determining that the command slot does not contain a token, GPU 12 dispatches the command in the command slot to one or more of processing units 34 without determining whether a preemption notification has been received (126). After dispatching the command for execution, GPU 12 may select a next command slot for processing in the first GPU command stream (122). The next command slot may be a command slot in a sequence of command slots that occurs immediately after the previously processed command slot.

Returning to decision block 124, in response to determining that the command slot does contain a token, GPU 12 determines whether a preemption notification has been received from a host device (e.g., CPU 6) that has not already been processed (128). For example, GPU 12 may check the state of a preemption notification received state variable that is indicative of whether a preemption notification has been received that has not already been processed. In response to determining that a preemption notification has not been received, GPU 12 dispatches the command in the command slot to one or more of processing units 34 (126). After dispatching the command for execution, GPU 12 may select a next command slot for processing in the first GPU command stream (122).

Returning to decision box 128, in response to determining that a preemption notification has been received, GPU 12 preempts execution of the first GPU command stream (130). Preemption of the execution of the first GPU command stream may involve, for example, saving a state of GPU 12 associated with execution of the first GPU command stream and, in some cases, loading a previously saved state of GPU 12 for executing a second GPU command stream. In some examples, GPU 12 may determine which command stream to execute in response to the preemption notification by reading a GPU register written to by CPU 6 that includes information identifying the location of the second GPU command stream.

GPU 12 executes the second GPU command stream (132). In some cases, the second GPU command stream may include preemption tokens that allow for preemption of the second GPU command stream. In such cases, GPU 12 may, for example, recursively perform the technique shown in FIG. 8 for executing the second GPU command stream. That is, GPU 12 may begin execution of the second GPU command stream at process box 120.

After completing the execution of the second GPU command stream, GPU 12 resumes execution of the first GPU command stream (134). Resuming execution of the first GPU command stream may involve, for example, restoring the saved state of GPU 12 associated with execution of the first GPU command stream. Resuming execution of the first GPU command stream may also involve, resetting the preemption notification received state variable to a value indicating that a preemption notification has not been received. After resuming execution of the first GPU command stream, GPU 12 may select a next command slot for processing in the first GPU command stream (122).

As shown in FIG. 8, GPU 12 may preempt execution of a GPU command stream (130) in response to determining that a preemption notification has been received (128—YES) and that a command slot for the current command processing cycle contains a token (124—YES). On the other hand, for a given command processing cycle, GPU 12 may dispatch the command in the command slot for execution on one or more of processing units 34 in GPU 12 without preempting execution of the GPU command stream during the given command processing cycle in response to determining either that a preemption notification has not been received (128—NO) or that the command slot for the current command processing cycle does not contain a token (124—NO).

Figure 9:
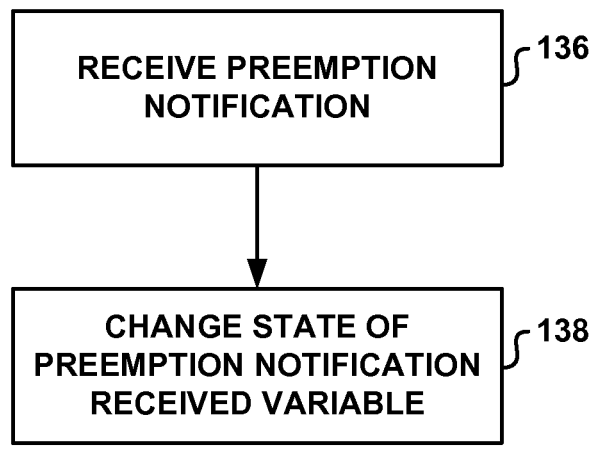
FIG. 9 is a flow diagram illustrating an example technique for handling preemption notifications when processing command streams according to the technique shown in FIG. 8.

FIG. 9 is a flow diagram illustrating an example technique for handling preemption notifications when processing command streams according to the technique shown in FIG. 8. GPU 12 receives and/or detects a preemption notification (136). For example, GPU 12 may poll a GPU register (e.g., a GPU hardware register and/or a GPU memory-mapped register) that contains a value indicative of whether CPU 6 has sent a preemption notification to GPU 12. When CPU 6 asserts the value in the GPU register, GPU 12 detects that a preemption notification has been received. In some examples, GPU 12 may asynchronously detect preemption notifications. For example, when the value in the GPU register has been asserted by CPU 6, an interrupt service routine may handle the assertion. In additional examples, GPU 12 may synchronously detect preemption notifications. For example, GPU 12 may poll a GPU register once per command slot (e.g., prior to processing the command in the command slot) to determine if a preemption notification has been received. In response to receiving and/or detecting a preemption notification, GPU 12 changes the status of the preemption notification received state variable to indicate that a preemption notification has been received (138).

Figure 10:
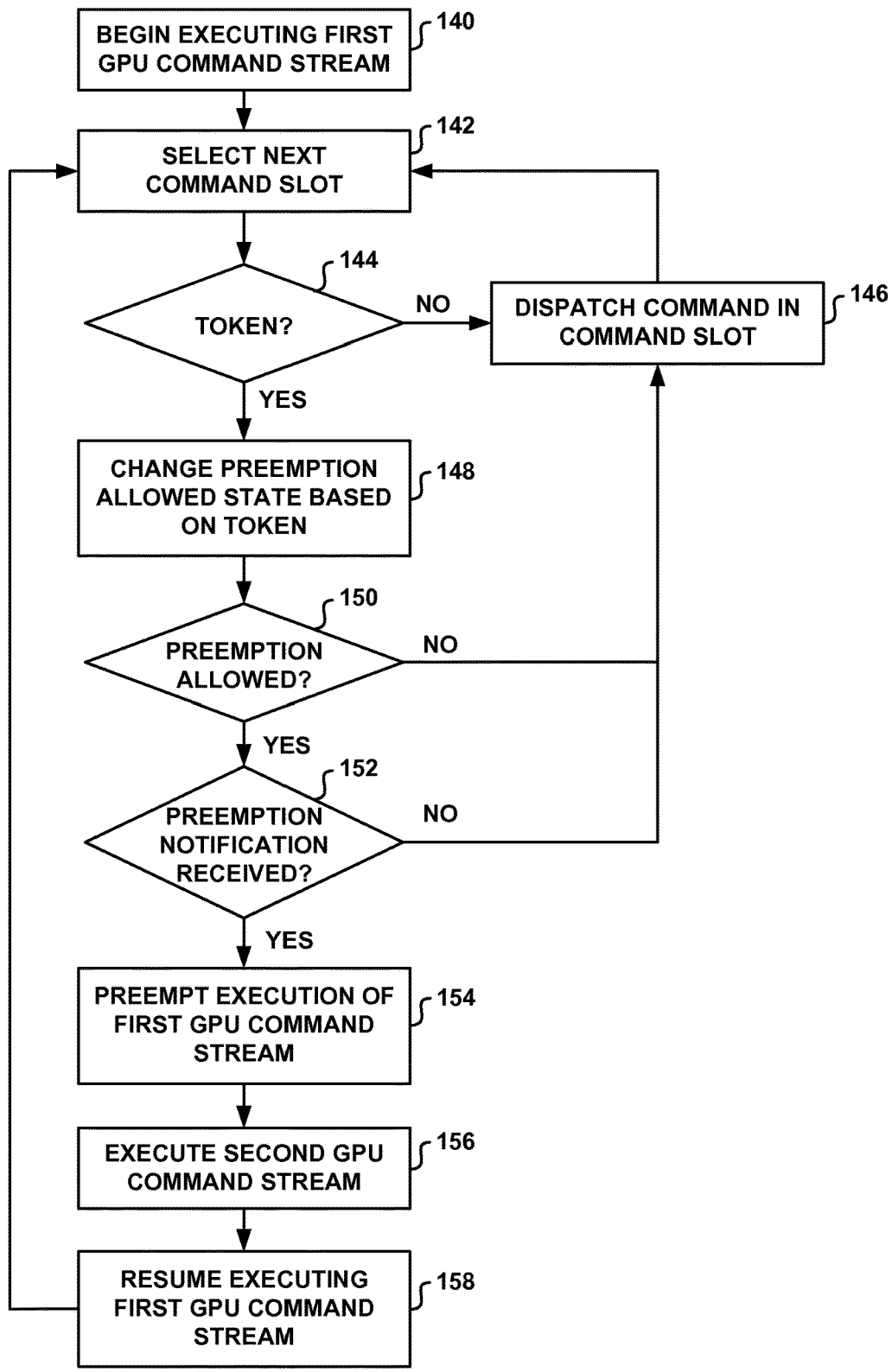
FIG. 10 is a flow diagram illustrating another example technique for processing GPU command streams in accordance with this disclosure.

FIG. 10 is a flow diagram illustrating another example technique for processing GPU command streams in accordance with this disclosure. The technique illustrated in FIG. 10 may be used with preemption tokens that indicate the beginning and end of particular preemption ranges where preemption is either allowed to occur or not allowed to occur, e.g., the preemption tokens described above with respect to FIG. 5.

GPU 12 begins executing a first GPU command stream (140). GPU 12 selects a next command slot for processing (142). In the case where GPU 12 performs process box 142 for the first time after beginning execution of the first GPU command stream, GPU 12 selects the first command slot in the first GPU command stream for processing.

GPU 12 determines if the command slot contains a token (144). In response to determining that the command slot does not contain a token, GPU 12 dispatches the command in the command slot to one or more of processing units 34 (146). After dispatching the command for execution, GPU 12 may select a next command slot for processing in the first GPU command stream (142). The next command slot may be a command slot in a sequence of command slots that occurs immediately after the previously processed command slot.

Returning to decision block 144, in response to determining that the command slot does contain a token, GPU 12 changes a preemption allowed state variable based on the token (148). For example, if the token designates the beginning of a preemptable range of a code (i.e., a preemption range) or if the token designates the end of a non-interruptible range of code, then GPU 12 may set the preemption allowed state variable to a value indicating that preemption is currently allowed for processing the current and subsequent command slots. As another example, if the token designates the end of a preemptable range of a code (i.e., a preemption range) or if the token designates the beginning of a non-interruptible range of code, then GPU 12 may set the preemption allowed state variable to a value indicating that preemption is currently not allowed for processing the current and subsequent command slots.

GPU 12 determines whether preemption is allowed for the current command processing cycle (150). For example, GPU 12 may determine whether preemption is allowed based on a preemption allowed state variable that is indicative of whether preemption is allowed for the current command processing cycle. As discussed above with respect to process block 148, the value of the preemption allowed state variable may be changed or set in response to processing one or more tokens in a GPU command stream. In response to determining that preemption is not allowed, GPU 12 dispatches the command in the command slot to one or more of processing units 34 (146). After dispatching the command for execution, GPU 12 selects a next command slot for processing in the first GPU command stream (142).

On the other hand, in response to determining that preemption is allowed, GPU 12 determines whether a preemption notification has been received from a host device (e.g., CPU 6) that has not already been processed (152). For example, GPU 12 may check the state of a preemption notification received state variable that is indicative of whether a preemption notification has been received that has not already been processed. In response to determining that a preemption notification has not been received, GPU 12 dispatches the command in the command slot to one or more of processing units 34 without necessarily preempting the GPU command stream for the current processing cycle (146). After dispatching the command for execution, GPU 12 selects a next command slot for processing in the first GPU command stream (142).

Returning to decision box 152, in response to determining that a preemption notification has been received, GPU 12 preempts execution of the first GPU command stream (154). Preemption of the execution of the first GPU command stream may involve, for example, saving a state of GPU 12 associated with execution of the first GPU command stream and, in some cases, loading a previously saved state of GPU 12 for executing a second GPU command stream. In some examples, GPU 12 may determine which command stream to execute in response to the preemption notification by reading a GPU register written to by CPU 6 and that includes information identifying the location of the second GPU command stream.

GPU 12 executes the second GPU command stream (156). In some cases, the second GPU command stream may include preemption tokens that allow for preemption of the second GPU command stream. In such cases, GPU 12 may, for example, recursively perform the technique shown in FIG. 10 for executing the second GPU command stream. That is, GPU 12 may begin execution of the second GPU command stream at process box 140.

After completing the execution of the second GPU command stream, GPU 12 resumes execution of the first GPU command stream (158). Resuming execution of the first GPU command stream may involve, for example, restoring the saved state of GPU 12 associated with execution of the first GPU command stream. Resuming execution of the first GPU command stream may also involve, resetting the preemption notification received state variable to a value indicating that a preemption notification has not been received. After resuming execution of the first GPU command stream, GPU 12 may select a next command slot for processing in the first GPU command stream (142).

As shown in FIG. 10, GPU 12 may preempt execution of a GPU command stream (154) in response to determining that a preemption notification has been received (152—YES) and that preemption is allowed for the current command processing cycle (150—YES). On the other hand, for a given command processing cycle, GPU 12 may dispatch the command in the command slot for execution on one or more of processing units 34 in GPU 12 without preempting execution of the GPU command stream during the given command processing cycle in response to determining either that a preemption notification has not been received (152—NO) or that preemption is not allowed for the current command processing cycle (150—NO).

Figure 11:
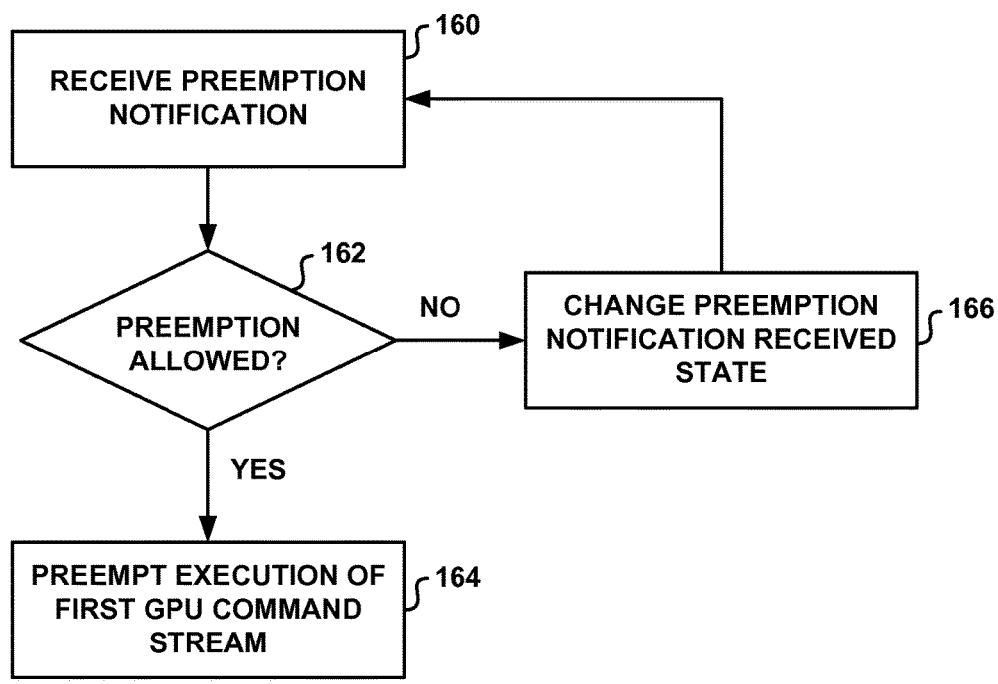
FIG. 11 is a flow diagram illustrating an example technique for handling preemption notifications when processing command streams according to the technique shown in FIG. 10.

FIG. 11 is a flow diagram illustrating an example technique for handling preemption notifications when processing command streams according to the technique shown in FIG. 10. GPU 12 receives and/or detects a preemption notification (160). For example, GPU 12 may poll a GPU register (e.g., a GPU hardware register and/or a GPU memory-mapped register) that contains a value indicative of whether CPU 6 has sent a preemption notification to GPU 12 in a manner similar that which was discussed above with respect to process box 136 of FIG. 9.

In response to receiving and/or detecting a preemption notification, GPU 12 determines whether preemption is allowed for the current command processing cycle (162). For example, GPU 12 may determine whether preemption is allowed based on a preemption allowed state variable that is indicative of whether preemption is allowed for the current command processing cycle. In response to determining that preemption is allowed, GPU 12 preempts execution of the first GPU command stream (164) and executes the second GPU command stream. In response to determining that preemption is not allowed, GPU 12 changes the status of the preemption notification received state variable to a value indicating that a preemption notification has been received (166), and returns to processing command slots in accordance with FIG. 10 until a preemption token is encountered that indicates that preemption is allowed. After encountering such a preemption token, GPU 12 may preempt execution of the first GPU command stream based on receipt of the previous preemption notification in accordance with the technique outlined in FIG. 10.

Various aspects of this disclosure describe a deferred-preemptive scheme for interrupting the parsing of queued GPU command streams and servicing pending higher priority command streams. The techniques of this disclosure may allow, in some examples, preemption at selected points in a GPU command stream queue that are marked by tokens. In some examples, the tokens may split the command stream into non-interruptible segments, thereby preventing preemption from happening in sensitive parts of the command stream. Preemption points may, in some examples, be statically or dynamically selected. In some examples, when a preemption request (i.e., a preemption notification) is initiated, a command parser in a GPU (e.g., command engine 32) may continue parsing a command stream until the nearest token is reached, at which point the command parser may switch to the command stream indicated by the preemption request, and return back to the normal command stream when done.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:
1. A method comprising:
prior to a graphics processing unit (GPU) reading a GPU command stream from memory, selecting, with a processor other than the GPU, one or more locations in the GPU command stream as being one or more locations at which the GPU that processes the GPU command stream is allowed to preempt execution of the GPU command stream in response to receiving a notification from the processor to preempt execution of the GPU command stream, wherein selecting the one or more locations comprises:

determining an estimated cost for performing a GPU context switch at each of the one or more locations in the GPU command stream, wherein the estimated cost is a function of at least one of: an amount of processing time needed to perform the GPU context switch, an amount of memory bandwidth needed to perform the GPU context switch, or an amount of memory needed to perform the GPU context switch at each of the one or more locations in the GPU command stream, and selecting the one or more locations in the GPU command stream based at least in part on the determined estimated cost for performing the GPU context switch at each of the one or more locations in the GPU command stream; and prior to the GPU reading the GPU command stream and after selecting the one or more locations in the GPU command stream, placing, with the processor, one or more tokens in the GPU command stream based on the selected one or more locations, the one or more tokens indicating to the GPU that preemption is allowed to occur at the selected one or more locations in the GPU command stream; and storing, by the processor, the GPU command stream that includes the one or more tokens into the memory for reading by the GPU.

2. The method of claim 1, wherein selecting the one or more locations comprises:

selecting the one or more locations in the GPU command stream based on information indicative of groupings of commands in the GPU command stream, each of the groupings of commands being associated with at least one of rendering of a respective one of a plurality of graphics frames, execution of a respective one of a plurality of GPU kernels, and execution of a respective one of a plurality of GPU tasks.

3. The method of claim 1, wherein selecting the one or more locations comprises:

selecting the one or more locations in the GPU command stream based on information received from a software application associated with the GPU command stream indicating at least one of particular commands where preemption should occur and particular commands where preemption should not occur.

4. The method of claim 1, wherein the GPU command stream is a first GPU command stream, and wherein selecting the one or more locations comprises:

selecting the one or more locations in the GPU command stream as being one or more locations at which the GPU is allowed to switch from execution of the first GPU command stream to execution of a second GPU command stream in response to receiving the notification from the processor to preempt execution of the first GPU command stream.

5. The method of claim 1, wherein selecting the one or more locations comprises:

selecting a plurality of locations in the GPU command stream as being locations at which the GPU is allowed to preempt execution of the GPU command stream.

6. The method of claim 1, wherein selecting the one or more locations comprises:

selecting one or more command boundaries as being locations at which the GPU is allowed to preempt execution of the GPU command stream.

7. The method of claim 1, wherein selecting the one or more locations comprises:

selecting one or more command ranges as being locations at which the GPU is allowed to preempt execution of the GPU command stream.

8. The method of claim 1, wherein selecting the one or more locations comprises:

selecting one or more command ranges as being locations at which the GPU is not allowed to preempt execution of the GPU command stream; and selecting the one or more locations as being locations at which the GPU is allowed to preempt execution of the GPU command stream based on the selected one or more command ranges.

9. The method of claim 1, further comprising:

placing the GPU command stream into a memory that is accessible by the GPU.

10. The method of claim 1, wherein the GPU command stream is a first GPU command stream, the method further comprising:

causing the GPU to begin execution of the first GPU command stream; and while the first GPU command stream is executing on the GPU, sending a notification to the GPU indicating that a second GPU command stream is ready to execute on the GPU and that the GPU should preempt any command streams executing on the GPU that have a scheduling priority lower than a scheduling priority of the first GPU command stream based on the one or more tokens placed in the GPU command stream, the second GPU command stream having a scheduling priority that is greater than a scheduling priority of the first GPU command stream.

11. The method of claim 1, further comprising:

preempting, with a GPU, execution of the GPU command stream based on the one or more tokens placed in the GPU command stream.

12. The method of claim 1, wherein the GPU command stream is a first GPU command stream, the method further comprising:

dispatching, with a GPU, one or more commands in the first GPU command stream for execution on one or more processing units of the GPU;

receiving, with the GPU, a notification indicating that a second GPU command stream is ready to execute on the GPU, the second GPU command stream having a scheduling priority that is greater than a scheduling priority of the first GPU command stream;

in response to receiving the notification, dispatching commands in the first GPU command stream, with the GPU, for execution on the one or more processing units until a token of the one or more tokens is encountered in the first GPU command stream;

saving, with the GPU, a state of the GPU associated with execution of the first GPU command stream in response to encountering the token in the first GPU command stream; and dispatching, with the GPU, one or more commands in the second GPU command stream for execution on the one or more processing units in response to encountering the token in the first GPU command stream.

13. The method of claim 12, further comprising:

restoring the saved state of the GPU after completing execution of the second GPU command stream.

14. A device comprising:
a processor configured to:
prior to a graphics processing unit (GPU) reading a GPU command stream from memory, select one or more locations in the GPU command stream as being one or more locations at which the GPU that processes the GPU command stream is allowed to preempt execution of the GPU command stream in response to receiving a notification from the processor to preempt execution of the GPU command stream, wherein the GPU is different from the processor, and wherein selecting the one or more locations comprises:
determining an estimated cost for performing a GPU context switch at each of the one or more locations in the GPU command stream, wherein the estimated cost is a function of at least one of: an amount of processing time needed to perform the GPU context switch, an amount of memory bandwidth needed to perform the GPU context switch, or an amount of memory needed to perform the GPU context switch at each of the one or more locations in the GPU command stream, and
selecting the one or more locations in the GPU command stream based at least on part on the determined estimated cost of performing the GPU context switch at each of the one or more locations in the GPU command stream;
prior to the GPU reading the GPU command stream and after selecting the one or more locations in the GPU command stream, place one or more tokens in the GPU command stream based on the selected one or more locations, the one or more tokens indicating to the GPU that preemption is allowed to occur at the selected one or more locations in the GPU command stream; and
storing the GPU command stream that includes the one or more tokens into the memory for reading by the GPU.

15. The device of claim 14, wherein the processor is further configured to select the one or more locations in the GPU command stream based on information indicative of groupings of commands in the GPU command stream, each of the groupings of commands being associated with at least one of rendering of a respective one of a plurality of graphics frames, execution of a respective one of a plurality of GPU kernels, and execution of a respective one of a plurality of GPU tasks.

16. The device of claim 14, wherein the processor is further configured to select the one or more locations in the GPU command stream based on information received from a software application associated with the GPU command stream indicating at least one of particular commands where preemption should occur and particular commands where preemption should not occur.

17. The device of claim 14, wherein the GPU command stream is a first GPU command stream, and wherein the processor is further configured to select the one or more locations in the GPU command stream as being one or more locations at which the GPU is allowed to switch from execution of the first GPU command stream to execution of a second GPU command stream in response to receiving the notification from the processor to preempt execution of the first GPU command stream.

18. The device of claim 14, wherein the processor is further configured to select a plurality of locations in the GPU command stream as being locations at which the GPU is allowed to preempt execution of the GPU command stream.

19. The device of claim 14, wherein the processor is further configured to select one or more command boundaries as being locations at which the GPU is allowed to preempt execution of the GPU command stream.

20. The device of claim 14, wherein the processor is further configured to select one or more command ranges as being locations at which the GPU is allowed to preempt execution of the GPU command stream.

21. The device of claim 14, wherein the processor is further configured to select one or more command ranges as being locations at which the GPU is not allowed to preempt execution of the GPU command stream, and to select the one or more locations as being locations at which the GPU is allowed to preempt execution of the GPU command stream based on the selected one or more command ranges.

22. The device of claim 14, wherein the processor is further configured to place the GPU command stream into a memory that is accessible by the GPU.

23. The device of claim 14, wherein the GPU command stream is a first GPU command stream, and wherein the processor is further configured to:
cause the GPU to begin execution of the first GPU command stream; and
while the first GPU command stream is executing on the GPU, send a notification to the GPU indicating that a second GPU command stream is ready to execute on the GPU and that the GPU should preempt any command streams executing on the GPU that have a scheduling priority lower than a scheduling priority of the first GPU command stream based on the one or more tokens placed in the GPU command stream, the second GPU command stream having a scheduling priority that is greater than a scheduling priority of the first GPU command stream.

24. The device of claim 14, further comprising:
a GPU configured to preempt execution of the GPU command stream based on the one or more tokens placed in the GPU command stream.

25. The device of claim 14, wherein the GPU command stream is a first GPU command stream, and wherein the GPU is further configured to:
dispatch one or more commands in the first GPU command stream for execution on one or more processing units of the GPU;
receive a notification indicating that a second GPU command stream is ready to execute on the GPU, the second GPU command stream having a scheduling priority that is greater than a scheduling priority of the first GPU command stream;
in response to receiving the notification, dispatch commands in the first GPU command stream for execution on the one or more processing units until a token of the one or more tokens is encountered in the first GPU command stream;
save a state of the GPU associated with execution of the first GPU command stream in response to encountering the token in the first GPU command stream; and
dispatch one or more commands in the second GPU command stream for execution on the one or more processing units in response to encountering the token in the first GPU command stream.

26. The device of claim 25, wherein the GPU is further configured to restore the saved state of the GPU after completing execution of the second GPU command stream.

27. The device of claim 14, wherein the device comprises a wireless communication device.

28. The device of claim 14, wherein the device comprises a mobile phone handset.

29. An apparatus comprising:
means for selecting, prior to a graphics processing unit (GPU) reading a GPU command stream from memory, one or more locations in the GPU command stream as being one or more locations at which the GPU that processes the GPU command stream is allowed to preempt execution of the GPU command stream in response to receiving a notification to preempt execution of the GPU command stream, wherein the means for selecting the one or more locations is different than the GPU, and wherein the means for selecting the one or more locations comprises:
   means for determining an estimated cost for performing a GPU context switch at each of the one or more locations in the GPU command stream, wherein the estimated cost is a function of at least one of: an amount of processing time needed to perform the GPU context switch, an amount of memory bandwidth needed to perform the GPU context switch, or an amount of memory needed to perform the GPU context switch at each of the one or more locations in the GPU command stream, and
   means for selecting the one or more locations in the GPU command stream based at least in part on the determined estimated cost of performing a GPU context switch at each of the one or more locations in the GPU command stream;
means for placing, prior to the GPU executing the GPU command stream and after selecting the one or more locations in the GPU command stream, one or more tokens in the GPU command stream based on the selected one or more locations, the one or more tokens indicating to the GPU that preemption is allowed to occur at the selected one or more locations in the GPU command stream; and
means for storing the GPU command stream that includes the one or more tokens into the memory for reading by the GPU.

30. The apparatus of claim 29, wherein the means for selecting the one or more locations comprises:
means for selecting the one or more locations in the GPU command stream based on information indicative of groupings of commands in the GPU command stream, each of the groupings of commands being associated with at least one of rendering of a respective one of a plurality of graphics frames, execution of a respective one of a plurality of GPU kernels, and execution of a respective one of a plurality of GPU tasks.

31. The apparatus of claim 29, wherein the means for selecting the one or more locations comprises:
means for selecting one or more command boundaries as being locations at which the GPU is allowed to preempt execution of the GPU command stream.

32. The apparatus of claim 29, wherein the means for selecting the one or more locations comprises:
means for selecting one or more command ranges as being locations at which the GPU is allowed to preempt execution of the GPU command stream.

33. The apparatus of claim 29, wherein the GPU command stream is a first GPU command stream, the apparatus further comprising:
means for causing the GPU to begin execution of the first GPU command stream; and
means for sending, while the first GPU command stream is executing on the GPU, a notification to the GPU indicating that a second GPU command stream is ready to execute on the GPU and that the GPU should preempt any command streams executing on the GPU that have a scheduling priority lower than a scheduling priority of the first GPU command stream based on the one or more tokens placed in the GPU command stream, the second GPU command stream having a scheduling priority that is greater than a scheduling priority of the first GPU command stream.

34. The apparatus of claim 29, further comprising:
means for preempting execution of the GPU command stream based on the one or more tokens placed in the GPU command stream.

35. The apparatus of claim 29, wherein the GPU command stream is a first GPU command stream, the apparatus further comprising:
means for dispatching one or more commands in the first GPU command stream for execution on one or more processing units of the GPU;
means for receiving a notification indicating that a second GPU command stream is ready to execute on the GPU, the second GPU command stream having a scheduling priority that is greater than a scheduling priority of the first GPU command stream;
means for dispatching, in response to receiving the notification, commands in the first GPU command stream for execution on the one or more processing units until a token of the one or more tokens is encountered in the first GPU command stream;
means for saving a state of the GPU associated with execution of the first GPU command stream in response to encountering the token in the first GPU command stream; and
means for dispatching one or more commands in the second GPU command stream for execution on the one or more processing units in response to encountering the token in the first GPU command stream.

36. A computer-readable storage medium storing instructions that, when executed, cause one or more processors to:
prior to a graphics processing unit (GPU) reading a GPU command stream from memory, select one or more locations in a the GPU command stream as being one or more locations at which the GPU that processes the GPU command stream is allowed to preempt execution of the GPU command stream in response to receiving a notification from the one or more processors to preempt execution of the GPU command stream, wherein the one or more processors are different than the GPU, and wherein selecting the one or more locations comprises:
   determine an estimated cost for performing a GPU context switch at each of the one or more locations in the GPU command stream, wherein the estimated cost is a function of at least one of: an amount of processing time needed to perform the GPU context switch, an amount of memory bandwidth needed to perform the GPU context switch, or an amount of memory needed to perform the GPU context switch at each of the one or more locations in the GPU command stream, and
   select the one or more locations in the GPU command stream based at least in part on the determined estimated cost of performing the GPU context switch at each of the one or more locations in the GPU command stream;

prior to the GPU reading the GPU command stream and after selecting the one or more locations in the GPU command stream, place one or more tokens in the GPU command stream based on the selected one or more locations, the one or more tokens indicating to the GPU that preemption is allowed to occur at the selected one or more locations in the GPU command stream; and storing the GPU command stream that includes the one or more tokens into the memory for reading by the GPU.

37. The computer-readable storage medium of claim 36, wherein the instructions that cause the one or more processors to select the one or more locations comprise instructions that, when executed, cause the one or more processors to:

select the one or more locations in the GPU command stream based on information indicative of groupings of commands in the GPU command stream, each of the groupings of commands being associated with at least one of rendering of a respective one of a plurality of graphics frames, execution of a respective one of a plurality of GPU kernels, and execution of a respective one of a plurality of GPU tasks.

38. The computer-readable storage medium of claim 36, wherein the instructions that cause the one or more processors to select the one or more locations comprise instructions that, when executed, cause the one or more processors to:

select one or more command boundaries as being locations at which the GPU is allowed to preempt execution of the GPU command stream.

39. The computer-readable storage medium of claim 36, wherein the instructions that cause the one or more processors to select the one or more locations comprise instructions that, when executed, cause the one or more processors to:

select one or more command ranges as being locations at which the GPU is allowed to preempt execution of the GPU command stream.

40. The computer-readable storage medium of claim 36, wherein the GPU command stream is a first GPU command stream, the computer-readable storage medium storing instructions that, when executed, cause one or more processors to:

cause the GPU to begin execution of the first GPU command stream; and while the first GPU command stream is executing on the GPU, send a notification to the GPU indicating that a second GPU command stream is ready to execute on the GPU and that the GPU should preempt any command streams executing on the GPU that have a scheduling priority lower than a scheduling priority of the first GPU command stream based on the one or more tokens placed in the GPU command stream, the second GPU command stream having a scheduling priority that is greater than a scheduling priority of the first GPU command stream.

41. A method comprising:

determining, with a graphics processing unit (GPU), whether a command slot in a GPU command stream contains a token of one or more tokens that are included in the GPU command stream in place of a command in the GPU command stream, the one or more tokens indicating that preemption is allowed to occur at one or more locations in the GPU command stream;

in response to determining that the command slot contains the token, indicating that preemption is allowed to occur at a location based on a location of the token in the command stream, and not the command, determining, with the GPU, whether a preemption notification has been received from a host device;

preempting, with the GPU, execution of the GPU command stream in response to determining that the preemption notification has been received and that the command slot contains the token of the one or more token; and dispatching the command in the command slot for execution on one or more processing units of the GPU without preempting execution of the GPU command stream during a current command processing cycle in response to determining either that the preemption notification has not been received or that the command slot does not contain the token of the one or more tokens.

42. The method of claim 41, wherein the command stream is a first GPU command stream, wherein the method further comprises:

dispatching, with the GPU, one or more commands in the first GPU command stream for execution on one or more processing units of the GPU;

receiving, with the GPU, the preemption notification from the host device indicating that a second GPU command stream is ready to execute on the GPU, the second GPU command stream having a scheduling priority that is greater than a scheduling priority of the first GPU command stream; and in response to receiving the preemption notification, dispatching commands in the first GPU command stream, with the GPU, for execution on the one or more processing units until the token of the one or more tokens is encountered in the first GPU command stream, wherein preempting the execution of the GPU command stream comprises:

saving, with the GPU, a state of the GPU associated with execution of the first GPU command stream in response to encountering the token in the first GPU command stream; and dispatching, with the GPU, one or more commands in the second GPU command stream for execution on the one or more processing units in response to encountering the token in the first GPU command stream.

43. The method of claim 41, further comprising:

determining whether preemption is allowed for the current command processing cycle based on a preemption allowed state variable that is indicative of whether preemption is allowed for the current command processing cycle, the value of the preemption allowed state variable being changed in response to processing one or more of the one or more tokens in the GPU command stream; and determining whether the preemption notification has been received from the host device, wherein preempting the execution of the GPU command stream comprises preempting execution of the GPU command stream in response to determining that the preemption notification has been received and that preemption is allowed for the current command processing cycle.

44. The method of claim 43, wherein:

dispatching the command in the command slot for execution on the one or more processing units of the GPU without preempting execution of the GPU command stream during the current command processing cycle is further in response to determining that preemption is not allowed for the current command processing cycle.

45. The method of claim 41, wherein the one or more locations in the command stream of the one or more tokens are determined based at least in part on an estimated cost for performing a GPU context switch at each of the one or more locations in the GPU command stream, wherein the estimated cost is a function of at least one of: an amount of processing time needed to perform the GPU context switch, an amount of memory bandwidth needed to perform the GPU context switch, or an amount of memory needed to perform the GPU context switch at each of the one or more locations in the GPU command stream.

46. An apparatus comprising:
a memory;
a graphics processing unit (GPU) configured to:
determine whether a command slot in a GPU command stream contains a token of one or more tokens that are included in the GPU command stream in place of a command in the GPU command stream, the one or more tokens indicating that preemption is allowed to occur at one or more locations in the GPU command stream;
in response to determining that the command slot contains the token, indicating that preemption is allowed to occur at a location based on a location of the token in the command stream, and not the command, determine whether a preemption notification has been received from a host device;
preempt execution of the GPU command stream based on one or more tokens in response to determining that the preemption notification has been received and that the command slot contains the token of the one or more tokens; and
dispatch the command in the command slot for execution on one or more processing units of the GPU without preempting execution of the GPU command stream during a current command processing cycle in response to determining either that the preemption notification has not been received or that the command slot does not contain the token of the one or more tokens.

47. The apparatus of claim 46, wherein the command stream is a first GPU command stream, and wherein the GPU is further configured to:
dispatch one or more commands in the first GPU command stream for execution on one or more processing units of the GPU;
receive the preemption notification from the host device indicating that a second GPU command stream is ready to execute on the GPU, the second GPU command stream having a scheduling priority that is greater than a scheduling priority of the first GPU command stream;
in response to receiving the preemption notification, dispatch commands in the first GPU command stream for execution on the one or more processing units until the token of the one or more tokens is encountered in the first GPU command stream;
save a state of the GPU associated with execution of the first GPU command stream in response to encountering the token in the first GPU command stream; and
dispatch one or more commands in the second GPU command stream for execution on the one or more processing units in response to encountering the token in the first GPU command stream.

48. The apparatus of claim 46, wherein the GPU is further configured to: determine whether preemption is allowed for the current command processing cycle based on a preemption allowed state variable that is indicative of whether preemption is allowed for the current command processing cycle, the value of the preemption allowed state variable being changed in response to processing one or more of the one or more tokens in the GPU command stream;
determine whether the preemption notification has been received from the host device; and
preempt execution of the GPU command stream in response to determining that the preemption notification has been received and that preemption is allowed for the current command processing cycle.

49. The apparatus of claim 48, wherein dispatching the command in command slot for execution on the one or more processing units of the GPU without preempting execution of the GPU command stream during the current command processing cycle is further in response to determining that preemption is not allowed for the current command processing cycle.

50. The apparatus of claim 46, wherein the apparatus comprises a wireless communication device.

51. The apparatus of claim 46, wherein the apparatus comprises a mobile phone handset.

52. The apparatus of claim 46, wherein the one or more locations in the command stream of the one or more tokens are determined based at least in part on an estimated cost for performing a GPU context switch at each of the one or more locations in the GPU command stream, wherein the estimated cost is a function of at least one of: an amount of processing time needed to perform the GPU context switch, an amount of memory bandwidth needed to perform the GPU context switch, or an amount of memory needed to perform the GPU context switch at each of the one or more locations in the GPU command stream.

53. An apparatus comprising:
means for executing a graphics processing unit (GPU) command stream that includes one or more tokens indicating that preemption is allowed to occur at one or more locations in the GPU command stream;
means for determining whether a command slot in the GPU command stream contains a token of the one or more tokens that are included in the GPU command stream in place of a command in the GPU command stream;
means for determining whether a preemption notification has been received from a host device in response to determining that the command slot contains the token, indicating that preemption is allowed to occur at a location based on a location of the token in the command stream, and not the command;
means for preempting execution of the GPU command stream in response to determining that the preemption notification has been received and that the command slot contains the token of the one or more token; and
means for dispatching the command in the command slot for execution on one or more processing units of the GPU without preempting execution of the GPU command stream during a current command processing cycle in response to determining either that the preemption notification has not been received or that the command slot does not contain the token of the one or more tokens.

54. The apparatus of claim 53,
wherein the command stream is a first GPU command stream,
wherein the apparatus further comprises:
means for dispatching one or more commands in the first GPU command stream for execution on one or more processing units of the GPU; means for receiving, with the GPU, the preemption notification from the host device indicating that a second GPU command stream is ready to execute on the GPU, the second GPU command stream having a scheduling priority that is greater than a scheduling priority of the first GPU command stream; and means for dispatching, in response to receiving the preemption notification, commands in the first GPU command stream for execution on the one or more processing units until the token of the one or more tokens is encountered in the first GPU command stream, wherein the means for preempting the execution of the GPU command stream comprises:

means for saving a state of the GPU associated with execution of the first GPU command stream in response to encountering the token in the first GPU command stream; and means for dispatching one or more commands in the second GPU command stream for execution on the one or more processing units in response to encountering the token in the first GPU command stream.

55. The apparatus of claim 53, further comprising:

means for determining whether preemption is allowed for the current command processing cycle based on a preemption allowed state variable that is indicative of whether preemption is allowed for the current command processing cycle, the value of the preemption allowed state variable being changed in response to processing one or more of the one or more tokens in the GPU command stream; and means for determining whether the preemption notification has been received from the host device, wherein the means for preempting the execution of the GPU command stream comprises means for preempting execution of the GPU command stream in response to determining that the preemption notification has been received and that preemption is allowed for the current command processing cycle.

56. The apparatus of claim 55, wherein:

the means for dispatching command in command slot for execution on one or more processing units of the GPU without preempting execution of the GPU command stream during the current command processing cycle is further in response to determining that preemption is not allowed for the current command processing cycle.

57. The apparatus of claim 53, wherein the one or more locations in the command stream of the one or more tokens are determined based at least in part on an estimated cost for performing a GPU context switch at each of the one or more locations in the GPU command stream, wherein the estimated cost is a function of at least one of: an amount of processing time needed to perform the GPU context switch, an amount of memory bandwidth needed to perform the GPU context switch, or an amount of memory needed to perform the GPU context switch at each of the one or more locations in the GPU command stream.

58. A computer-readable storage medium storing instructions that, when executed, cause a graphics processing unit (GPU) to:

determine whether a command slot in a GPU command stream contains a token of one or more tokens that are included in the GPU command stream in place of a command in the GPU command stream, the one or more tokens indicating that preemption is allowed to occur at one or more locations in the GPU command stream;

in response to determining that the command slot contains the token, indicating that preemption is allowed to occur at a location based on a location of the token in the command stream, and not the command, determine whether a preemption notification has been received from a host device;

preempt execution of the GPU command stream in response to determining that the preemption notification has been received and that the command slot contains the token of the one or more tokens; and dispatch the command in the command slot for execution on one or more processing units of the GPU without preempting execution of the GPU command stream during a current command processing cycle in response to determining either that the preemption notification has not been received or that the command slot does not contain the token of the one or more tokens.

59. The computer-readable storage medium of claim 58, wherein the command stream is a first GPU command stream, and wherein the computer-readable storage medium further comprises instructions that, when executed, cause the GPU to:

dispatch one or more commands in the first GPU command stream for execution on one or more processing units of the GPU;

receive the preemption notification from the host device indicating that a second GPU command stream is ready to execute on the GPU, the second GPU command stream having a scheduling priority that is greater than a scheduling priority of the first GPU command stream;

in response to receiving the preemption notification, dispatch commands in the first GPU command stream for execution on the one or more processing units until the token of the one or more tokens is encountered in the first GPU command stream;

save a state of the GPU associated with execution of the first GPU command stream in response to encountering the token in the first GPU command stream; and dispatch one or more commands in the second GPU command stream for execution on the one or more processing units in response to encountering the token in the first GPU command stream.

60. The computer-readable storage medium of claim 58, further comprising instructions that, when executed, cause the GPU to:

determine whether preemption is allowed for the current command processing cycle based on a preemption allowed state variable that is indicative of whether preemption is allowed for the current command processing cycle, the value of the preemption allowed state variable being changed in response to processing one or more of the one or more tokens in the GPU command stream;

determine whether the preemption notification has been received from the host device; and preempt execution of the GPU command stream in response to determining that the preemption notification has been received and that preemption is allowed for the current command processing cycle.

61. The computer-readable storage medium of claim 60, wherein:

dispatching the command in the command slot for execution on one or more processing units of the GPU without preempting execution of the GPU command stream during the current command processing cycle is further in response to determining that preemption is not allowed for the current command processing cycle.

62. The computer-readable storage medium of claim 58, wherein the one or more locations in the command stream of the one or more tokens are determined based at least in part on an estimated cost for performing a GPU context switch at each of the one or more locations in the GPU command stream, wherein the estimated cost is a function of at least one of: an amount of processing time needed to perform the GPU context switch, an amount of memory bandwidth needed to perform the GPU context switch, or an amount of memory needed to perform the GPU context switch at each of the one or more locations in the GPU command stream.

* * * * *